US008223880B2

(12) United States Patent (10) Patent No.: US 8,223,880 B2
Baril et al. (45) Date of Patent: Jul. 17, 2012

(54) SYSTEM AND METHOD FOR POWER LINE COMMUNICATION

(75) Inventors: Steve Baril, St.-Elzéar (CA); Charles Labarre, McMasterville (CA)

(73) Assignee: Analog Devices, B.V., Norwood, MA (US)

(*) Notice: Subject to any disclaimer, the term of this patent is extended or adjusted under 35 U.S.C. 154(b) by 899 days.

(21) Appl. No.: 11/376,949

(22) Filed: Mar. 16, 2006

(65) Prior Publication Data

US 2006/0226958 A1 Oct. 12, 2006

(30) Foreign Application Priority Data

Mar. 16, 2005 (CA) .................................... 2500699
Dec. 1, 2005 (CA) .................................... 2528799

(51) Int. Cl.
*H04L 27/12* (2006.01)
(52) U.S. Cl. ........................ 375/295; 375/303
(58) Field of Classification Search .................. 375/272, 375/273, 275, 295, 269, 279, 283, 303, 308, 375/309, 329, 334, 256, 302, 377; 340/310.11, 340/310.12, 310.01, 310.18, 288, 538, 538.13, 340/310.02, 310.03, 310.04; 370/401; 455/402, 455/560
See application file for complete search history.

(56) References Cited

U.S. PATENT DOCUMENTS

| | | | | |
|---|---|---|---|---|
| 3,689,886 A * | 9/1972 | Durkee | | 340/12.32 |
| 4,300,126 A | 11/1981 | Gajjar | | |
| 4,479,215 A * | 10/1984 | Baker | | 714/749 |
| 4,556,866 A * | 12/1985 | Gorecki | | 375/272 |
| 4,577,333 A * | 3/1986 | Lewis et al. | | 375/272 |
| 5,090,024 A * | 2/1992 | Vander Mey et al. | | 375/139 |
| 5,448,593 A | 9/1995 | Hill | | |
| 5,491,463 A * | 2/1996 | Sargeant et al. | | 340/12.37 |
| 5,828,293 A * | 10/1998 | Rickard | | 375/257 |
| 5,852,636 A * | 12/1998 | Mathieu et al. | | 375/272 |
| 6,144,292 A | 11/2000 | Brown | | |
| 6,349,111 B1 * | 2/2002 | Huloux | | 375/222 |
| 6,559,757 B1 * | 5/2003 | Deller et al. | | 370/206 |
| 6,608,552 B1 * | 8/2003 | Fogel et al. | | 340/310.11 |
| 6,972,672 B2 * | 12/2005 | Desai | | 340/444 |

(Continued)

FOREIGN PATENT DOCUMENTS

EP 1259007 11/2002

(Continued)

OTHER PUBLICATIONS

Ackerman et al., Protocol to Avoid Noise in Power Line Networks, 2005, International Symposium on Power Line Communcations and Its Applications, pp. 181-185.*

*Primary Examiner* — Lawrence B Williams
(74) *Attorney, Agent, or Firm* — Kenyon & Kenyon LLP

(57) ABSTRACT

A communication system for a power line is described. A transmission system of the communication system divides the time axis into a number of time slots synchronized such that one time slot can start about a zero crossing of the power line signal. These time slots may be referred to as channels. Data may initially be modulated into at least one of these time slots over a first transmission period according to a modulation scheme. The time slots and/or modulation scheme used in subsequent transmission periods may be adjusted depending on transmission feedback relating to prior modulated data.

26 Claims, 21 Drawing Sheets

The powerline is the medium where the data is exchanged.

Reception

The data signal is received by the analog front-end by means of the coupling circuit. A bandpass filter and a gain are used to filter the signal and to increase is strength. After this stage, the signal is routed through the micro-controller ADC or comparator. The samples received are then stored to RAM if needed.

Transmission

The micro-controller initiates the transmission via its pulse width modulator or DAC. This analog signal is then filtered in order to respect regulations. Once filtered the signal is amplified and transmitted to the powerline via the coupling circuit.

U.S. PATENT DOCUMENTS

| | | | |
|---|---|---|---|
| 7,050,831 B2 * | 5/2006 | Meiksin et al. | 455/560 |
| 7,158,013 B2 * | 1/2007 | Schwager et al. | 370/478 |
| 7,265,654 B1 * | 9/2007 | Lester | 340/310.12 |
| 7,345,998 B2 * | 3/2008 | Cregg et al. | 370/230 |
| 7,702,085 B2 * | 4/2010 | Zumkeller et al. | 379/90.01 |
| 2002/0153999 A1 * | 10/2002 | Wang et al. | 340/310.01 |
| 2003/0156013 A1 * | 8/2003 | Bub et al. | 340/310.01 |
| 2004/0037311 A1 | 2/2004 | Willes et al. | |
| 2004/0064775 A1 * | 4/2004 | Gaskill et al. | 714/749 |
| 2004/0136396 A1 * | 7/2004 | Yonge et al. | 370/445 |
| 2004/0160990 A1 * | 8/2004 | Logvinov et al. | 370/509 |
| 2005/0017849 A1 * | 1/2005 | Flen et al. | 340/310.01 |
| 2005/0055586 A1 * | 3/2005 | Flen et al. | 713/300 |
| 2005/0190860 A1 * | 9/2005 | Neubauer et al. | 375/316 |
| 2005/0264694 A1 * | 12/2005 | Ilan et al. | 348/473 |
| 2006/0126617 A1 * | 6/2006 | Cregg et al. | 370/389 |
| 2006/0226958 A1 * | 10/2006 | Baril et al. | 340/310.11 |
| 2009/0235000 A1 * | 9/2009 | Takada et al. | 710/110 |

FOREIGN PATENT DOCUMENTS

| | | |
|---|---|---|
| EP | 1689091 A1 | 8/2006 |
| FR | 2736781 A1 | 1/1997 |

* cited by examiner

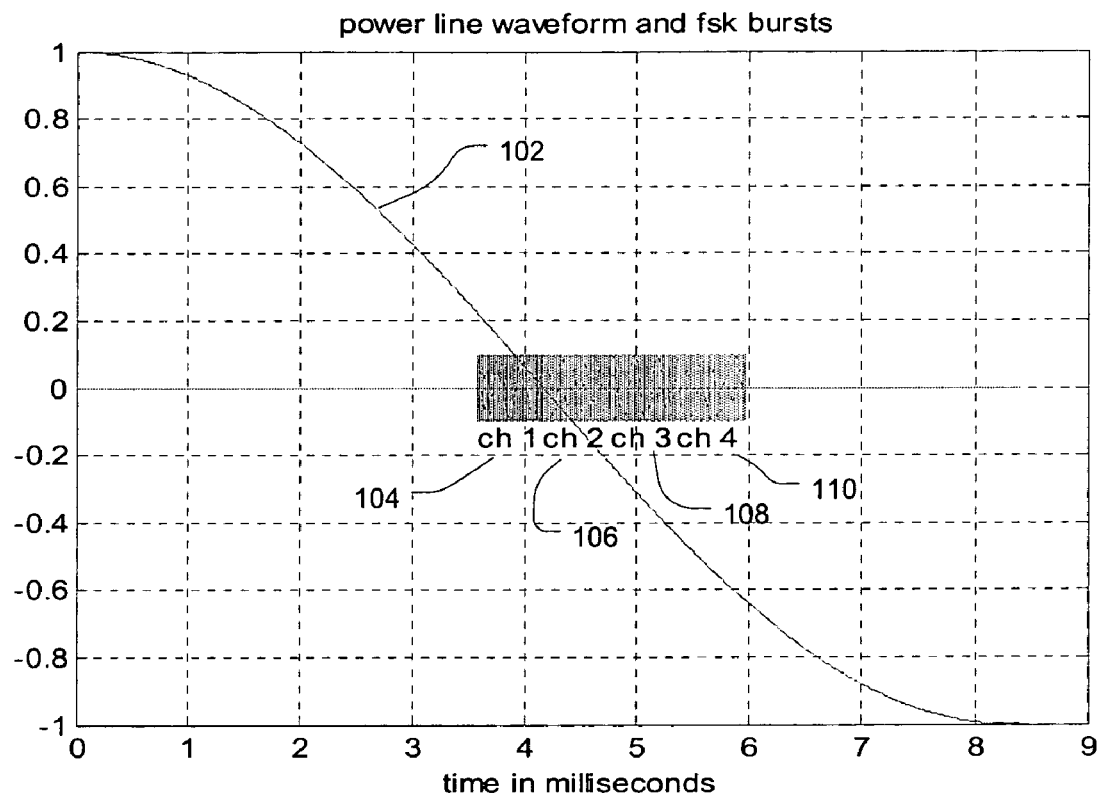
Figure 1a - FSK burst slots in one half power line cycle
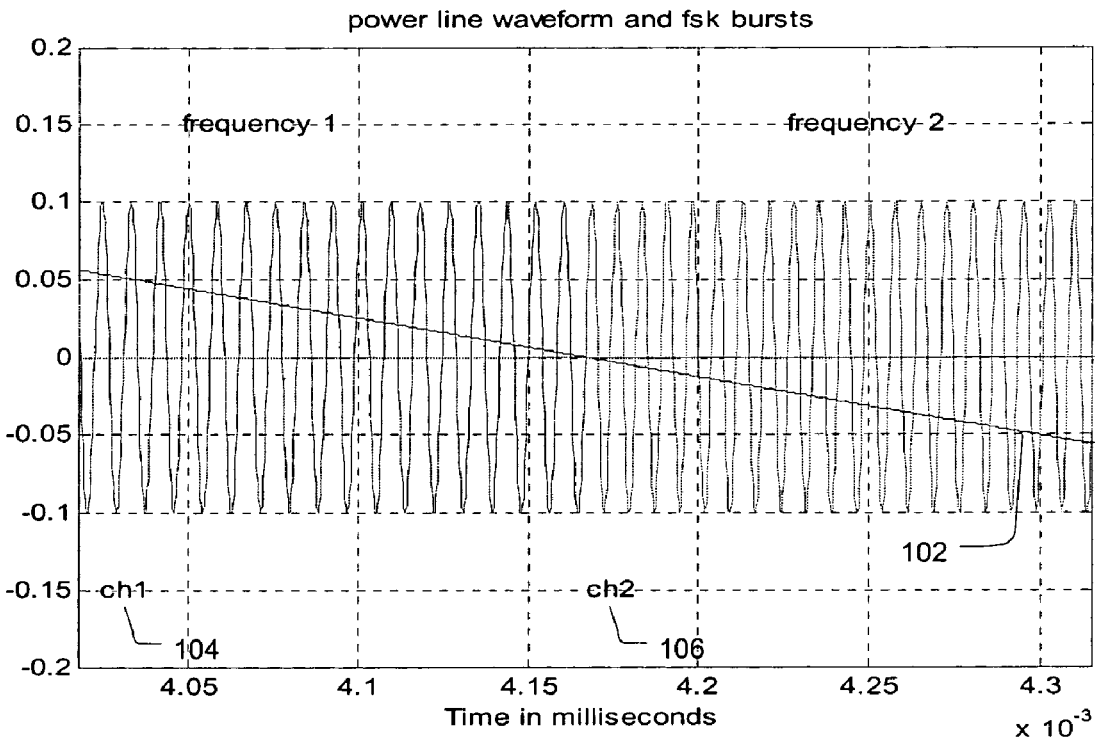
Figure 1b - FSK burst slots around the zero crossing

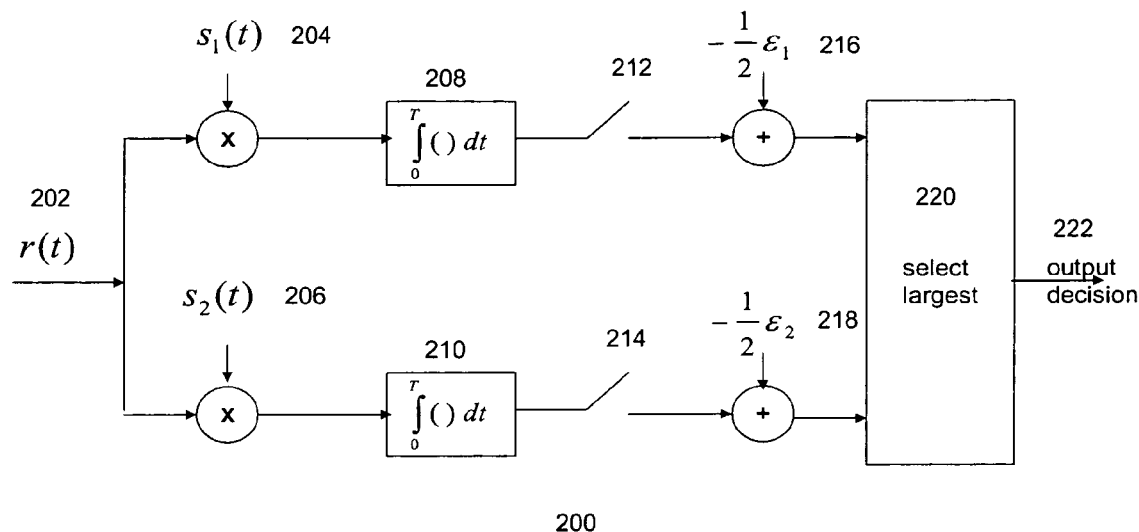
Figure 2 - Correlation receiver for two frequency FSK
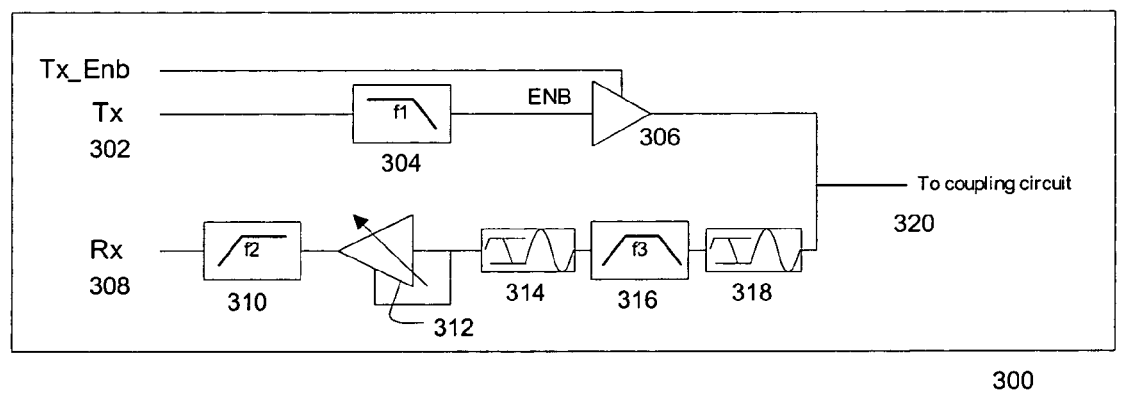
Figure 3 - AFE Block Diagram

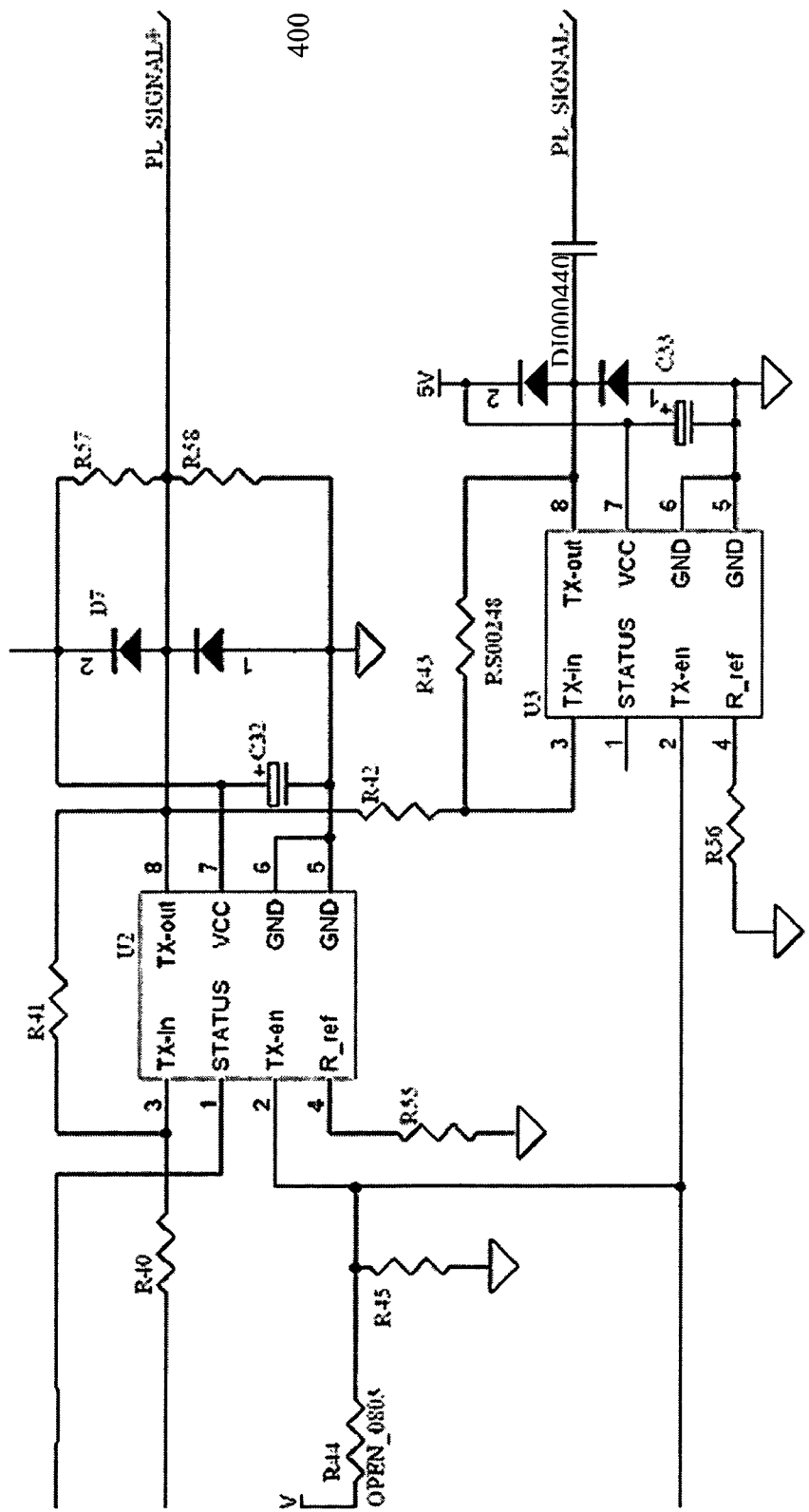

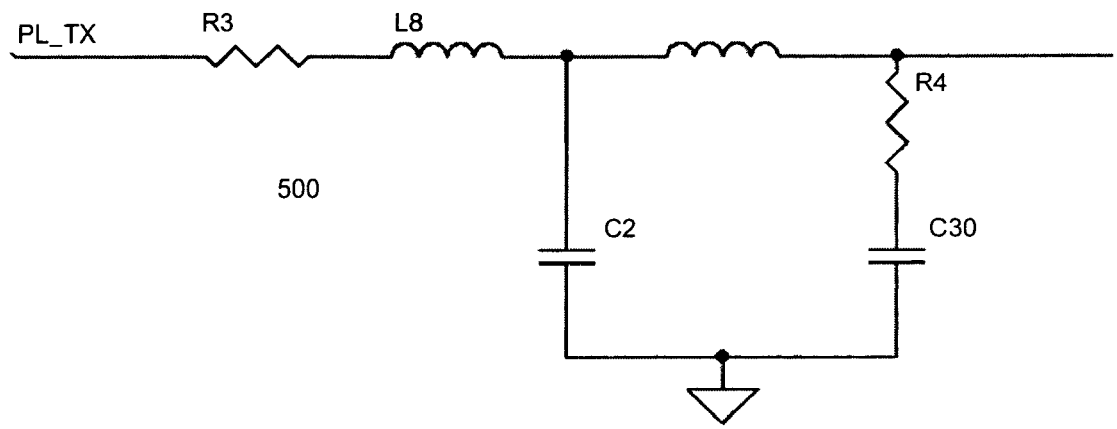
Figure 5 - Low Pass Filter
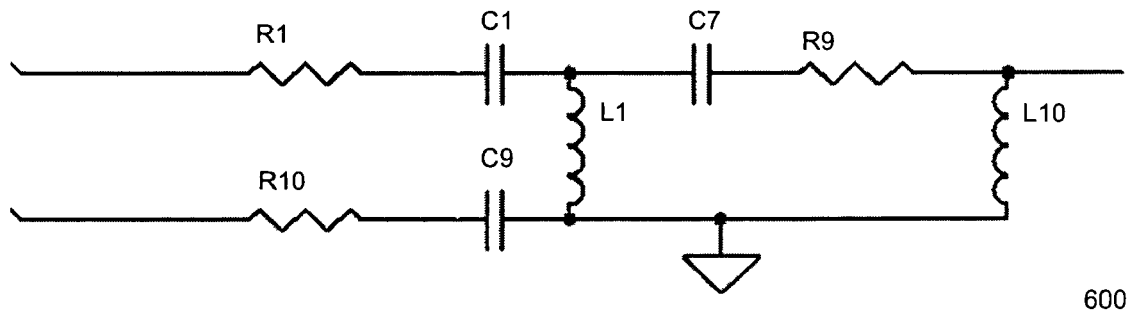
Figure 6 - High Pass Filter

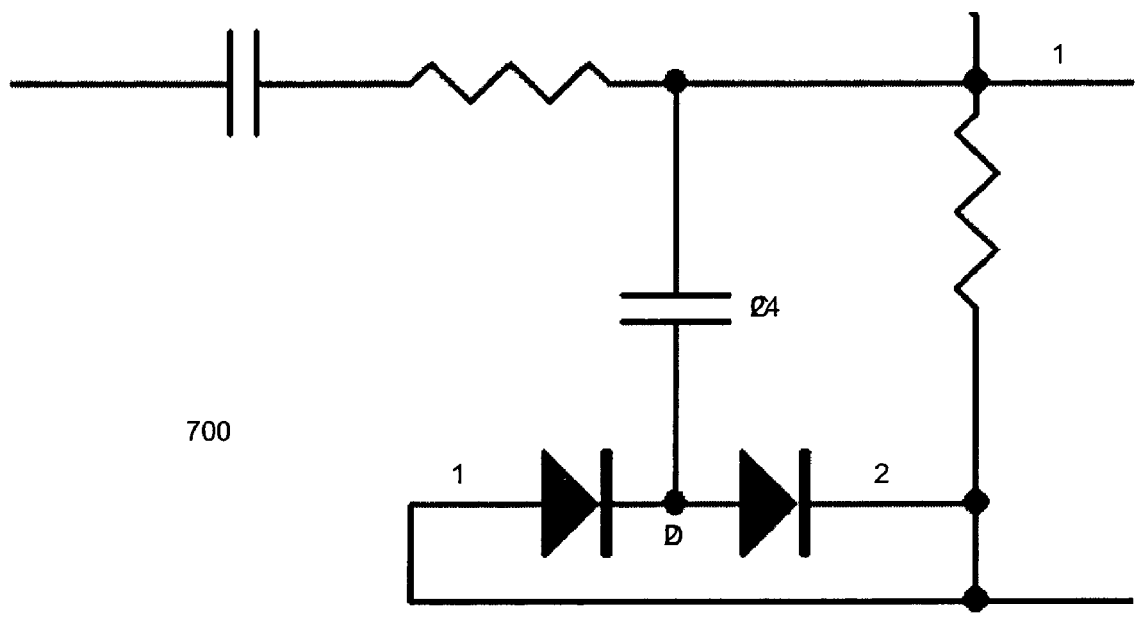
Figure 7 - Protection Circuit

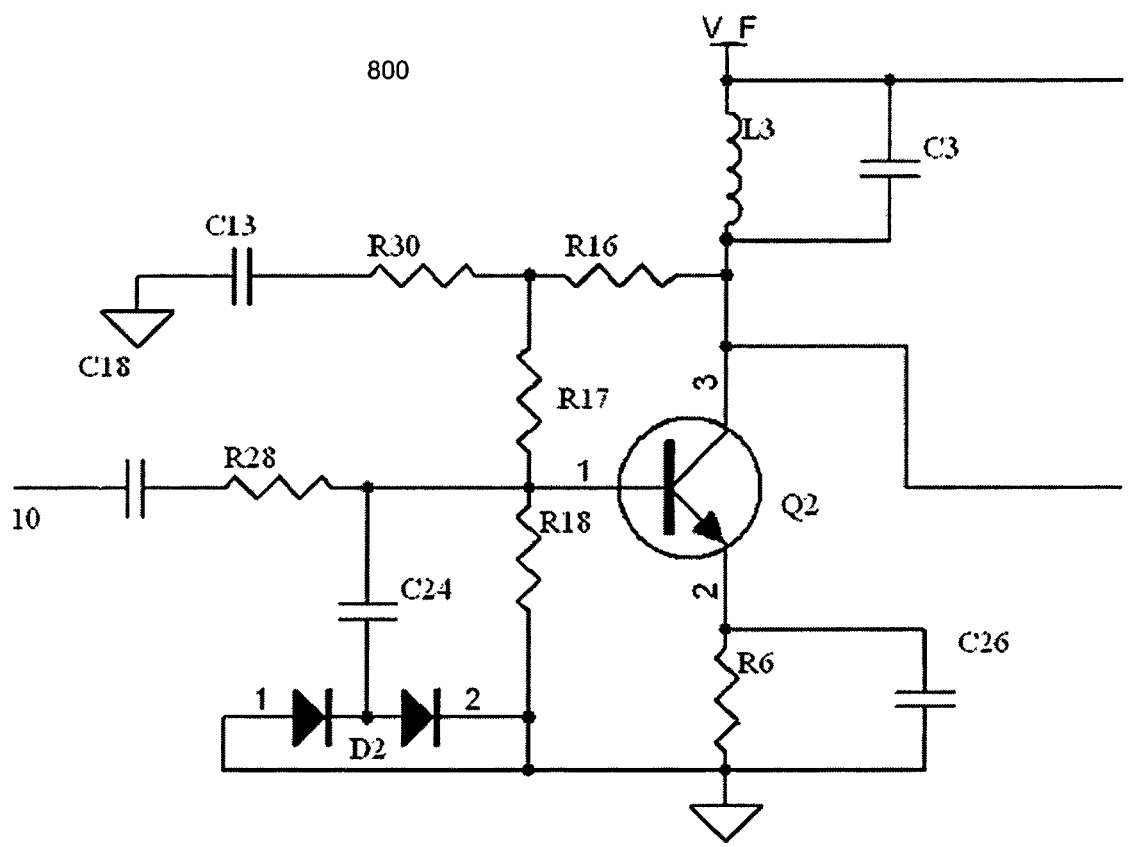
Figure 8 - Band Pass Filter and Amplifier

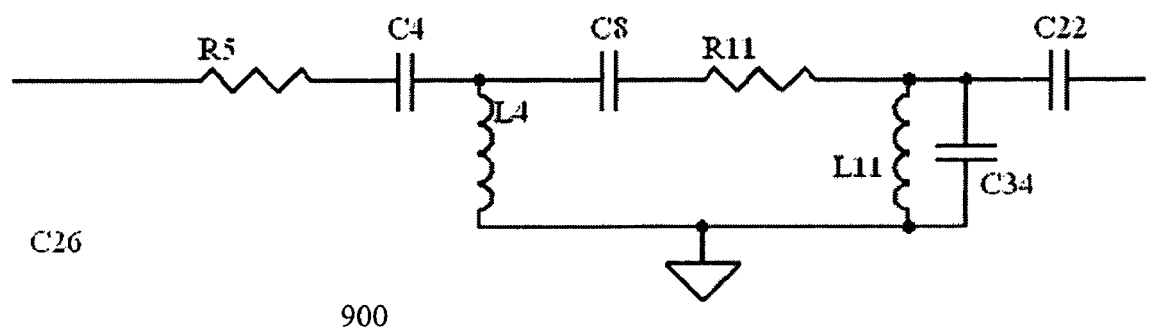
Figure 9 - High Pass Filter
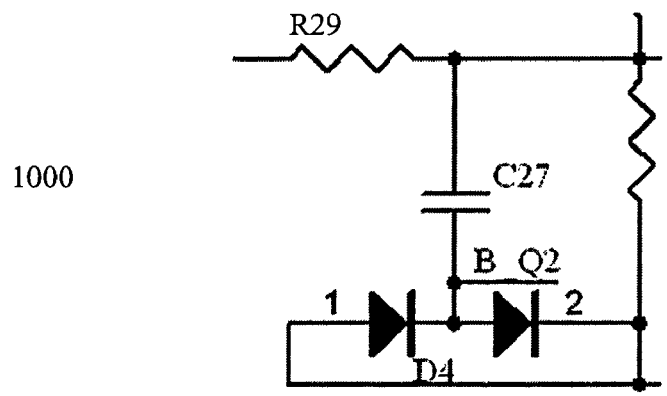
Figure 10 - Protection Diode Circuit

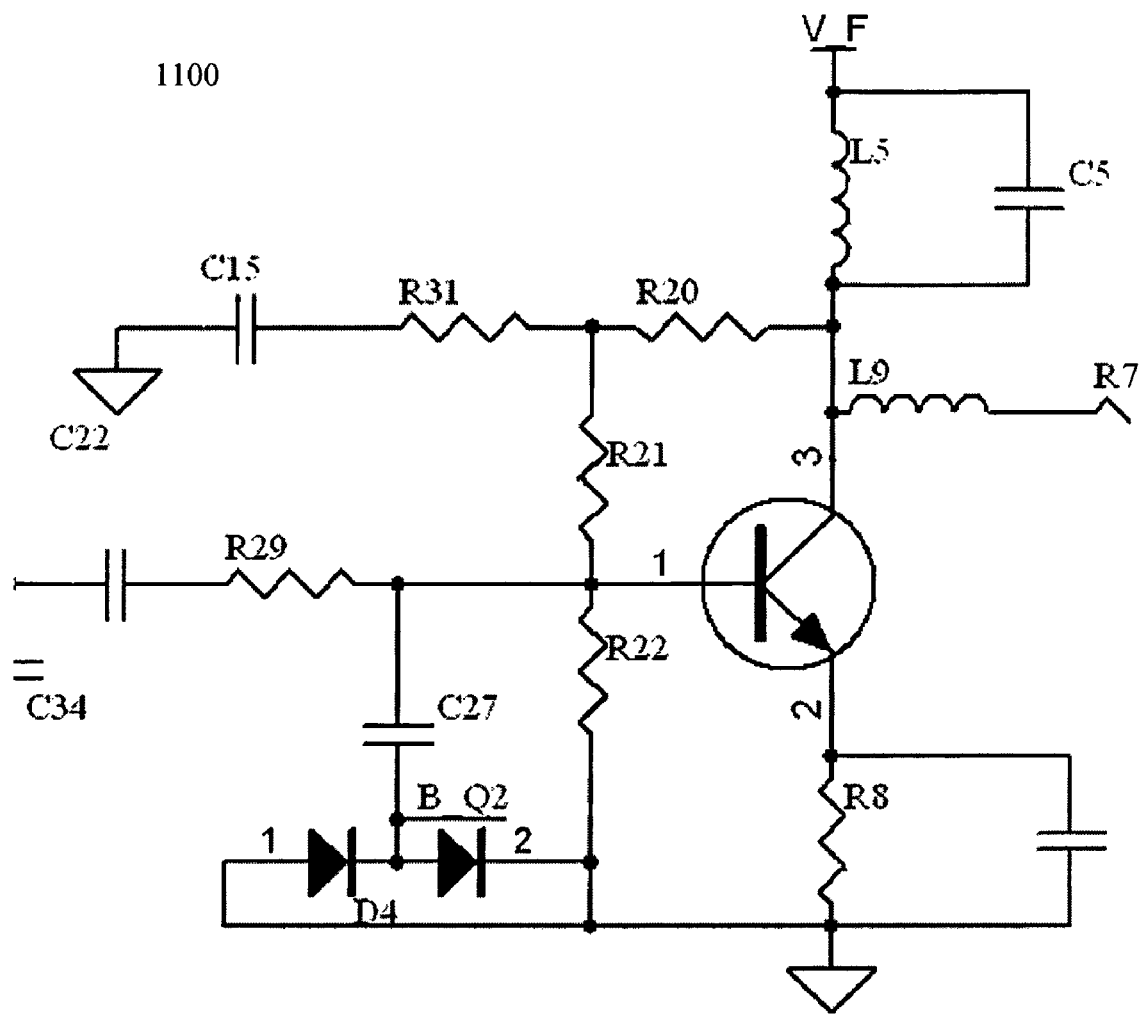
Figure 11 – Band Pass Filter and Amplifier
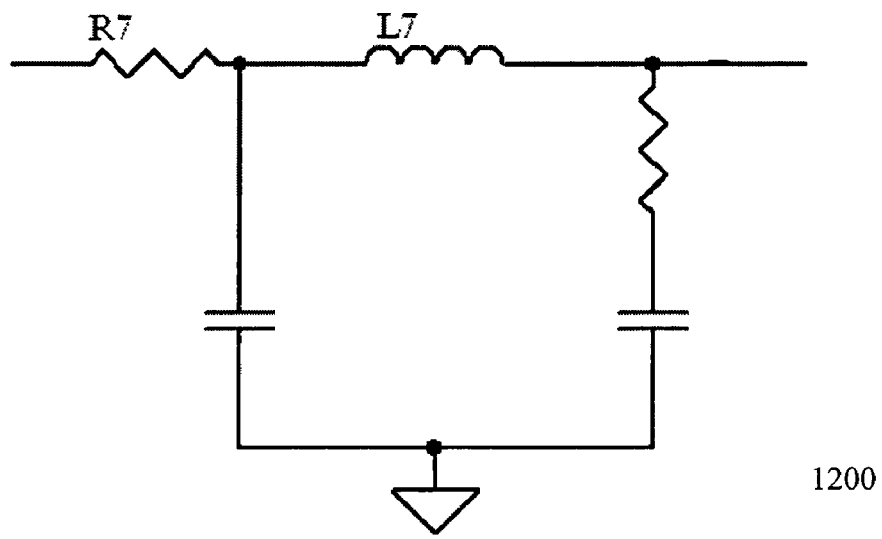
Figure 12 – Low Pass Filter

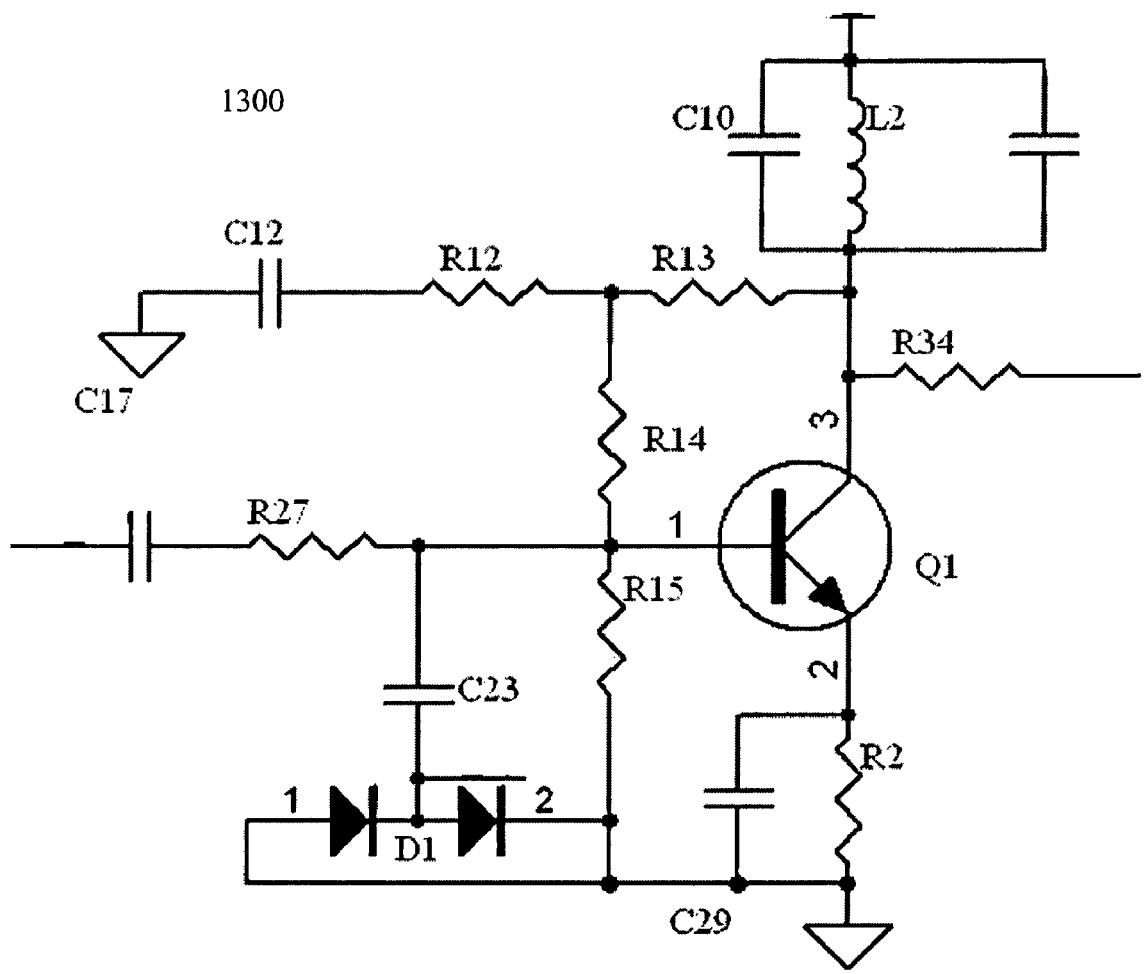
Figure 13 - Band Pass Filter and Amplifier
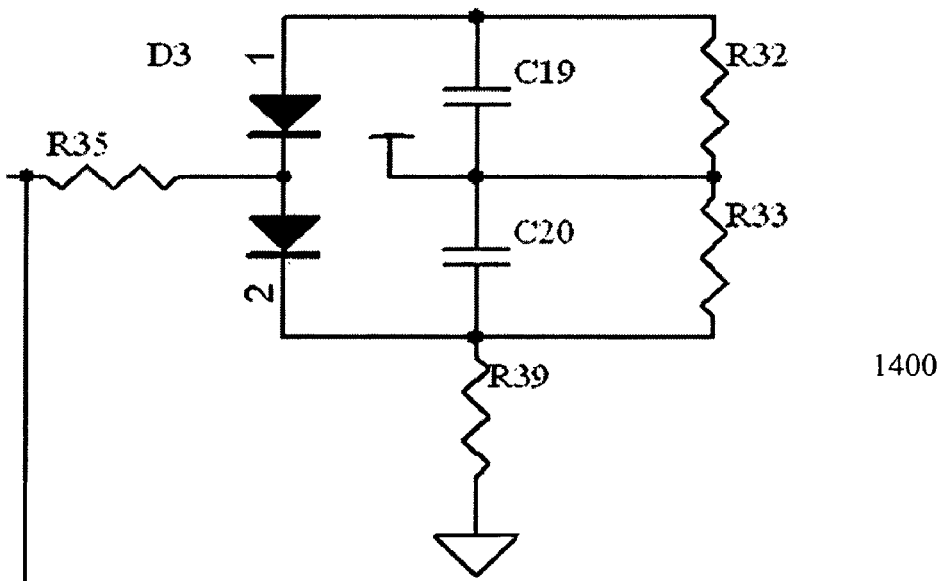
Figure 14 - Limiter

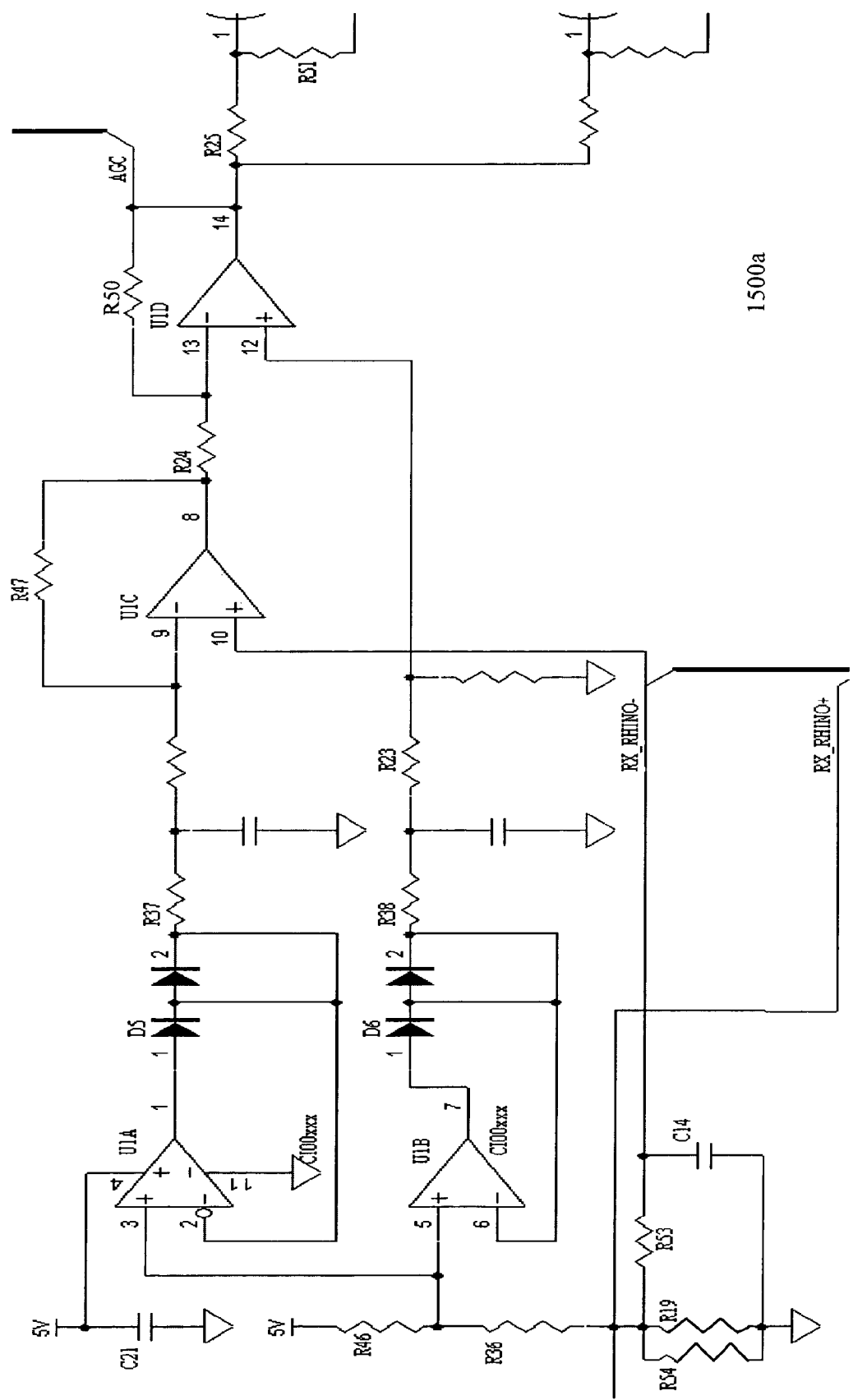
Figure 15a – Automatic Gain Control Amplifier

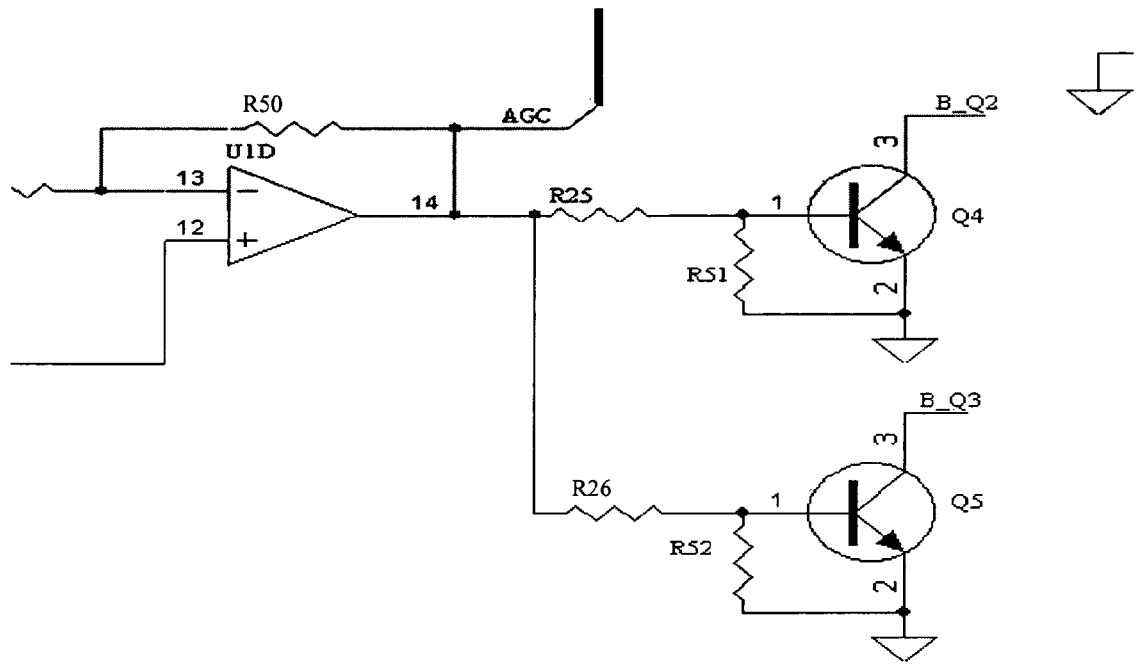
Figure 15b – Gain Control Amplifier
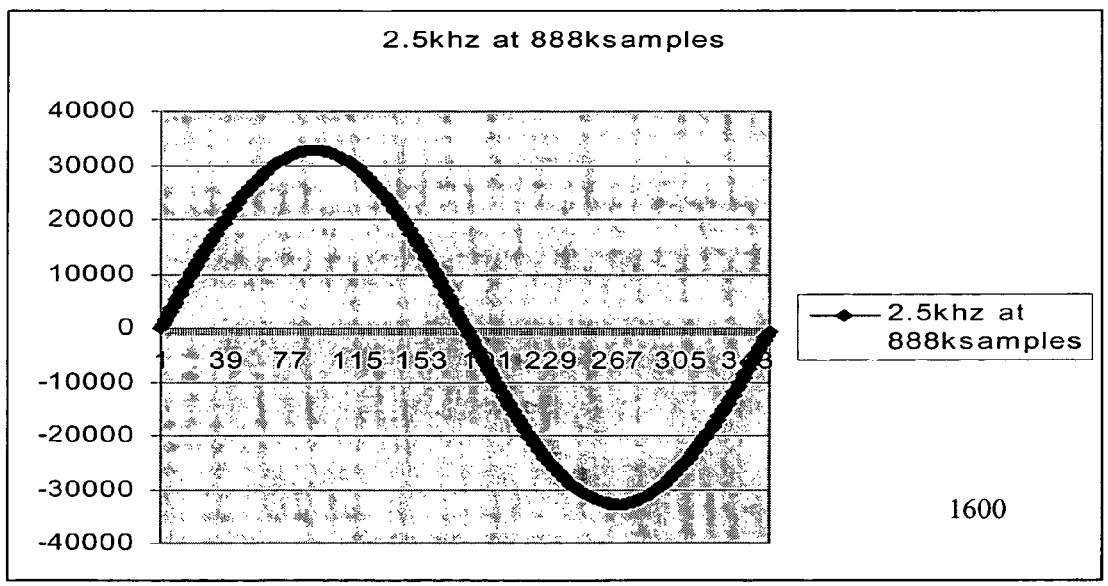
Figure 16

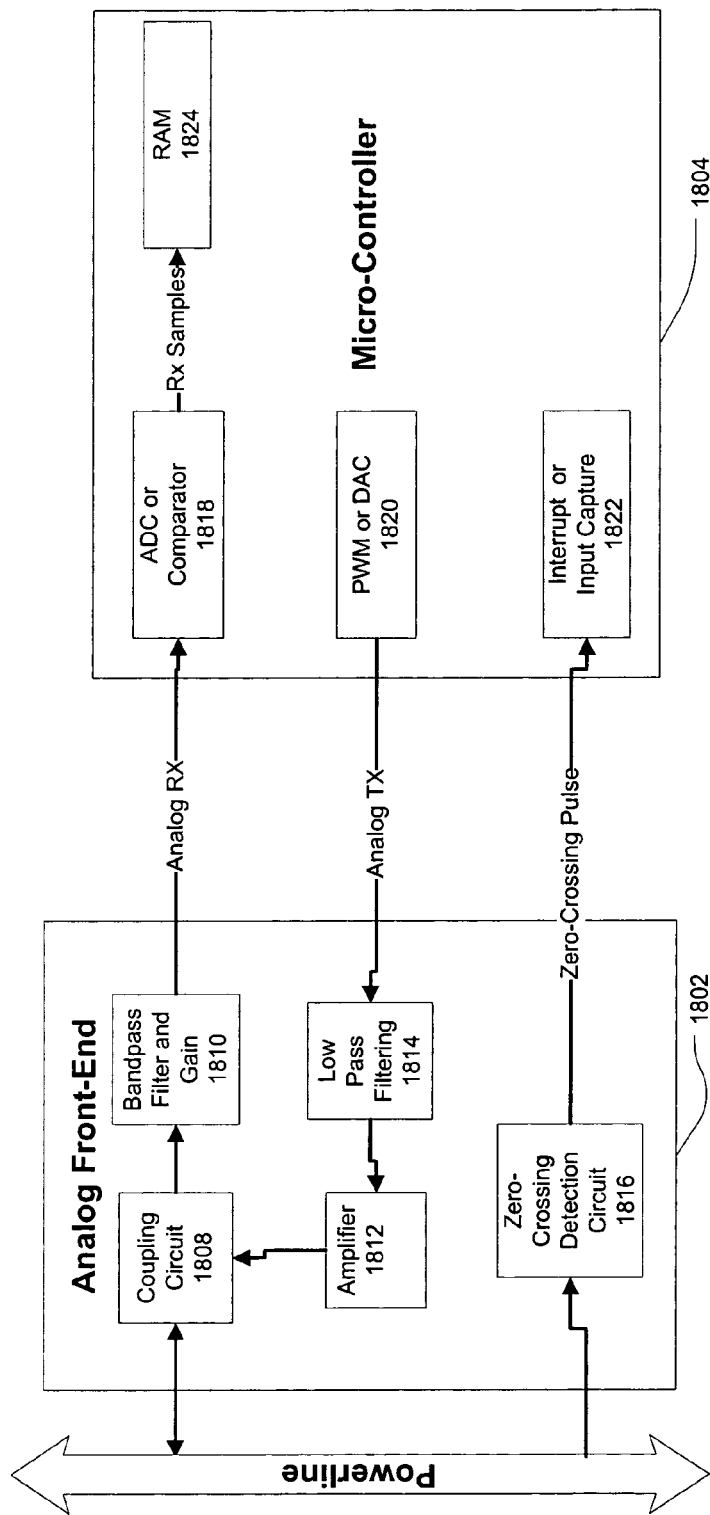

The powerline is the medium where the data is exchanged.

Reception

The data signal is received by the analog front-end by means of the coupling circuit. A bandpass filter and a gain are used to filter the signal and to increase is strength. After this stage, the signal is routed through the micro-controller ADC or comparator. The samples received are then stored to RAM if needed.

Transmission

The micro-controller initiates the transmission via its pulse width modulator or DAC. This analog signal is then filtered in order to respect regulations. Once filtered the signal is amplified and transmitted to the powerline via the coupling circuit.

Figure 18

In this example, the zero-crossing pulses occur at T1 and T2. The Timer A (1) will be loaded with a duration equals to (T2 - T1) - Offset. The Timer A (2) will expire at T3 at which time the burst is processed whether in TX or RX mode.

At the beginning of the burst, the RX samples are buffered for the entire duration of the burst. Therefore n samples are buffered into the RAM memory.

The burst is separated into many channels, where the samples are equally distributed.

Once the buffering is completed, discrete fourier transforms (DFTs) are calculated for each channel and each frequency. Therefore, if there are 4 channels in each burst and if 8 frequencies are supported by the receiver then 32 DFTs are performed.

Once each channel's frequency DFTs results are stored into memory, the Merged channel processing function is called.

Once merging is done, the calculate frequency magnitude process is called.

When all magnitudes are processed, the bit processing function is called.

Figure 21 continued

$$Magnitude = \sqrt{\mathrm{Im}\,aginary^2 + \mathrm{Re}\,al^2}$$

Figure 23

| Frequency | | Bit Coding |
| --- | --- | --- |
| Window 1 | Window 2 | |
| 0 | 1 | 0 |
| 1 | 0 | 1 |

Figure 24

SYSTEM AND METHOD FOR POWER LINE COMMUNICATION

FIELD OF THE INVENTION

This invention relates to a system and method of communications for power line media, particularly transmission in the presence of high amplitude, non-stationary noise sources connected to the line.

BACKGROUND

Current high speed communication on power line media (e.g. standard in house wiring) uses a variety of modulation techniques to overcome the highly noisy environment. Two types of systems have been commonly used. Firstly, wideband systems that use spread spectrum to combat the interference may be used, see for example U.S. Pat. Nos. 5,574,748; 5,090,024; 5,263,046; 6,243,413; 6,616,254; 5,579,335; and 5,748,671, the contents of which are hereby incorporated by reference.

Secondly, narrow band systems that use one or more frequencies modulated in frequency or phase may also be used. See for example U.S. Pat. Nos. 5,504,454 and 4,475,217, the contents of which are hereby incorporated by reference.

It is noted that a type of modulation techniques may also use various kind of synchronization. Exemplary techniques are described in U.S. Pat. Nos. 6,734,784; 6,577,231; 6,784,790; 6,907,472; and 5,553,081, the contents of which are hereby incorporated by reference.

The type of system used is also a function of the frequency spectrum allowed in the country of use. Most countries do not allocate enough spectrum for the wideband spread spectrum systems, so narrowband systems have been favoured, see for example:

USA: FCC, PART 15 47 CFR CH.1 A, RADIO FREQUENCY DEVICES (PART 15);
EUROPE: EN50065-1—SIGNALING ON LOW-VOLTAGE ELECTRICAL INSTALLATIONS IN THE FREQUENCY RANGE 3 kHz TO 148.5 kHz; and
CANADA: ICES-006, Issue 1, Aug. 25, 2001, AC Wire Carrier Current Devices (Unintentional Radiators), the contents of which are hereby incorporated by reference.

One feature of these systems is that they use continuous transmission for each message, where a message typically consists of 100's of bits. However it has been observed from a large sample of data from the field that the noise on typical power lines where a number of disturbing devices are connected is not constant in either time or frequency, but exhibits quiet periods in both dimensions. Current systems do not efficiently handle these situations.

There is a need to provide a system and method of signal transmission that addresses at least some of these issues.

SUMMARY OF THE INVENTION

In a first aspect, a method for encoding data to be transmitted over a power line carrying an AC-power signal over a time period is provided. The method comprises: situating the time period about a zero crossing of the power signal; and encoding the data into the power signal in at least one signal over the time period using a signal diversity scheme. The diversity scheme can include time and frequency diversification techniques for the transmitted data signals.

In the method, the step of encoding the data may comprise: dividing the time period into a number of time slots; modulating the data signal using different signals for each of the time slots and adding the resulting signal to the power signal. This process of selectively adding a modulated data signal to the power signal may be referred to as encoding the data into the power signal in the remainder of the specification.

In the method, the step of modulating the data may utilize FSK signals to encode the data into the power signal; and m modulating frequencies may be used to modulate the data, and m may be selected such that an integral number of full cycles fit into each time slot for all m frequencies.

In the method, the data may be encoded over two or more time slots. Alternatively or additionally, the data may be encoded using two or more signals each having a different frequency. Still further the initial phases of the signals may differ. Still further, the data may be encoded over two timeslots and differences in energies detected during each of those two time slots may be used to determine the value of the data.

The method may further comprise decoding the data from the power signal by detecting differences in energies in each of those two time slots.

In the method, the data may be encoded over at least two of the time slots.

The method may further comprise decoding the data from the time slots by summing and merging signals extracted from the slots.

In a second aspect, a circuit for transmitting outbound data and receiving inbound data in an AC-power signal is provided. The system comprises: a connection to the AC-power signal; a circuit to detect a zero crossing of the power signal; an encoding module to encode and inject the outbound data into the power signal in at least two signals over a time period around the zero crossing; and a decoding module to extract and decode the inbound data from the power signal around the time period around the zero crossing. In the system, FSK signals are used to encode and decode the inbound and outbound data.

In the circuit, the inbound data may be encoded over multiple time slots of the time slots and may be decoded by summing and merging signals extracted from each of the multiple time slots. The signals may include real and complex voltage values.

In a third aspect, a method for transmitting data over a power line in a time period is provided. The method comprises: dividing the time period into a number of time slots synchronized such that one time slot starts about a zero crossing of a power line signal for transmitting the data, each time slot being relating to a channel and being numbered from 1 to n; modulating a narrow band continuous phase FSK in which a number m of modulating frequencies are used, and arranged such that an integral number of full cycles fit into each time slot for each channel for all m frequencies; and transmitting data during only a subset of the available time slots concentrated near the zero crossing of the power line signal.

In other aspects, various combinations of sets and subsets of the above aspects are provided.

BRIEF DESCRIPTION OF THE DRAWINGS

Aspects of the invention will become more apparent from the following description of specific embodiments thereof and the accompanying drawings which illustrate, by way of example only, the principles of the invention. In the drawings, where like elements feature like reference numerals (and wherein individual elements bear unique alphabetical suffixes):

FIG. 1a is a graph of exemplary FSK burst slots in one half power line cycle produced by an embodiment;

FIG. 1b is another view of the FSK burst slots of FIG. 1a;

FIG. 2 is a block diagram of correlation receiver for a two frequency FSK of the embodiment related to FIG. 1a;

FIG. 3 is block diagram of an analog front end (AFE) of an embodiment related to FIG. 1a;

FIG. 4 is a schematic diagram of a transmitter circuit of the AFE of FIG. 3;

FIG. 5 is a schematic diagram of a low pass filter of the AFE of FIG. 3;

FIG. 6 is a schematic diagram of a high pass filter of the AFE of FIG. 3;

FIG. 7 is a schematic diagram of a protection circuit of the AFE of FIG. 3;

FIG. 8 is a schematic diagram of a band pass filter and amplifier of the AFE of FIG. 3;

FIG. 9 is a schematic diagram of a high pass filter of the AFE of FIG. 3;

FIG. 10 is a schematic diagram of a protection diode circuit of the AFE of FIG. 3;

FIG. 11 is a schematic diagram of a band pass filter and amplifier of the AFE of FIG. 3;

FIG. 12 is a schematic diagram of another low pass filter of the AFE of FIG. 3;

FIG. 13 is a schematic diagram of another band pass filter and amplifier of the AFE of FIG. 3;

FIG. 14 is a schematic diagram of a limiter of the AFE of FIG. 3;

FIGS. 15a and 15b are schematic diagrams of an automatic gain control amplifier of the AFE of FIG. 3;

FIG. 16 is chart showing an optimized reception and transmission of multiple frequencies using a sine wave for the embodiment of FIG. 3;

FIG. 18 is a block diagram of another analog front end (AFE) of another embodiment connected to a microcontroller;

FIG. 23 is a signal magnitude calculation formula used by the AFE of FIG. 18;

FIG. 24 is a chart summarizing a bit coding algorithm for a differential bit receiver;

DETAILED DESCRIPTION OF EMBODIMENTS

Figure 17:
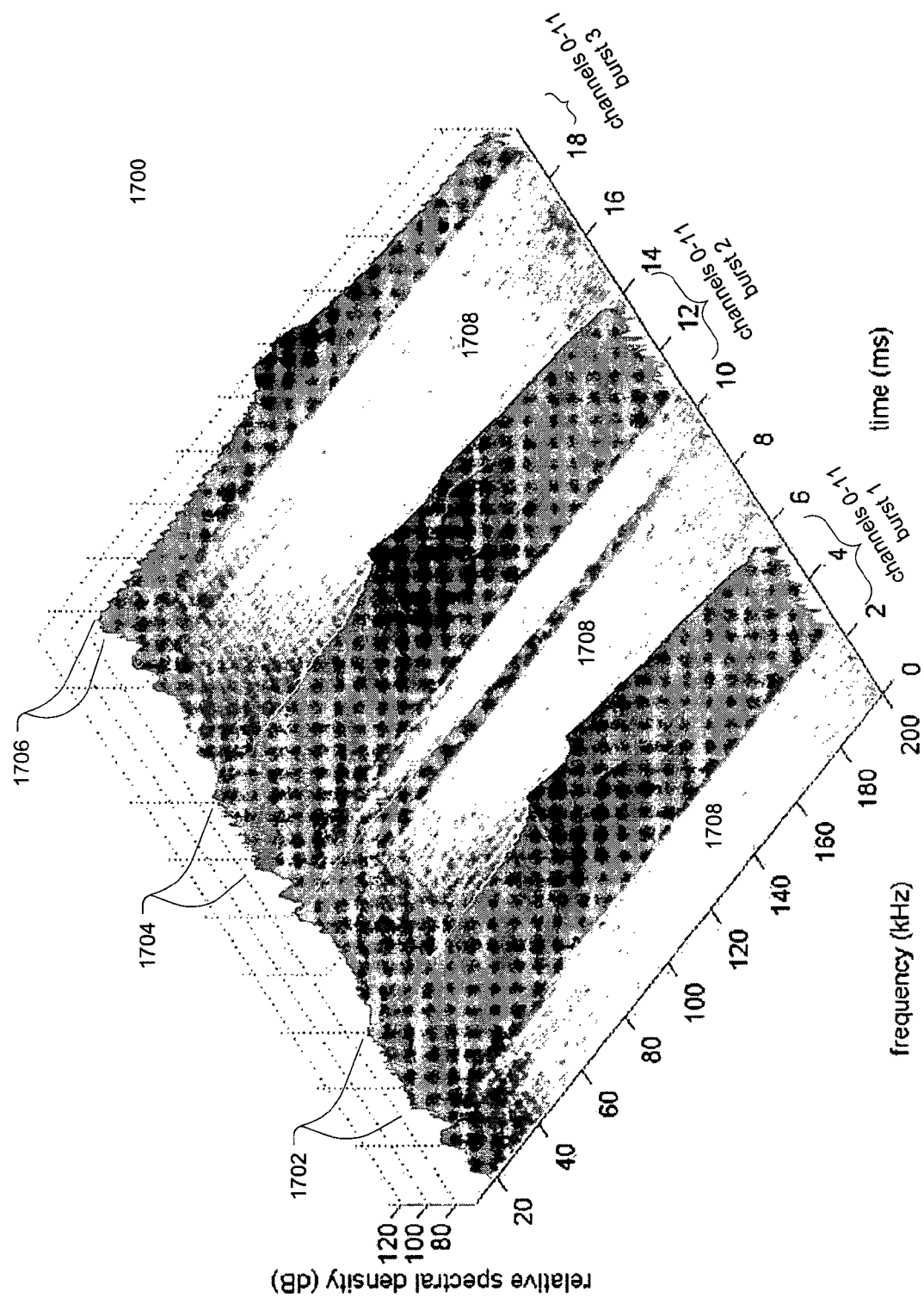
FIG. 17 is a graph showing a spectral density graph of signals processed by the embodiment of FIG. 3.

The description which follows, and the embodiments described therein, are provided by way of illustration of an example, or examples, of particular embodiments of the principles of the present invention. These examples are provided for the purposes of explanation, and not limitation, of those principles and of the invention. In the description, which follows, like parts are marked throughout the specification and the drawings with the same respective reference numerals.

Briefly, a signal transmission system and method related to an embodiment of the present invention uses both time and frequency diversity in the transmitted signal to improve the robustness of the system. The robustness is improved notably in the presence of large amounts of non-stationary power line noise. As such, the embodiment achieves significantly improved performance in very adverse conditions.

In an aspect of the embodiment, the transmission system divides the time axis into a number of time slots synchronized such that one time slot starts at the zero crossing of an alternative current (AC) power line signal (50 or 60 Hz depending on the region). These time slots are called channels and numbered from 1 to n. For the embodiment, the notion of a channel and a timeslot may be used interchangeably. However, if necessary, the terms can be used to mean different concepts. In particular, a channel can be thought to be a logical boundary while a time slot can be a specific implementation of the channel. The modulation method preferably used is narrow band continuous phase FSK, where a number m of modulating frequencies are used, arranged such that an integral number of full cycles fit into each channel time slot for all m frequencies. The system transmits during only a subset of the available time slots (channels) concentrated near the zero crossing of the power line waveform where the noise is typically minimal. In addition the initial phase of the individual frequencies may be varied (from zero going positive to zero going negative). This allows differential reception where only the difference in energy between two bursts is used instead of the actual value, leading to further robustness in the presence of noise.

The different channels may be used to transfer data to different clients at the same time. In addition they may also be combined to provide diversity as outlined below.

The system can use diversity of signal transmissions by transmitting the same bit over one or more channels (time slots) and one or more frequencies as well as one of the two phases. It uses a positive acknowledgment protocol with a reverse channel to tell the transmitter which redundancy method to use at any given time. The transmitter and receiver are both synchronized to the power line signal zero crossing and the default transmission method is the lowest bit rate using the maximum diversity. The system preferably uses a cyclic redundancy check (CRC) polynomial to detect the correct reception of messages. If the CRC is not received correctly, no acknowledgment is sent and the transmitter will revert to its default high redundancy state after some programmable delay.

In the descriptions that follow, an embodiment of the system is described using a particular example of 4 channels and 2 frequencies on a 60 Hz power line. However it should be clear to anyone versed in the art that this can be readily changed to n channels and m frequencies as well as the use on other power line frequencies (e.g. 50 Hz), in other embodiments.

Burst Mode FSK

For the embodiment, one transmission method that can be used is traditional FSK with two frequencies. Referring to FIGS. 1a and 1b, a power wave 102 is shown. The period of the power line waveform is divided into a number of segments and transmission of data occurs during some but not all these segments. Thus consider segments of 600 µsec—in a 60 Hz power line the period is 16.67 msec and the half period is 8.33 msec, giving 14 time slots of 595 µsec in one half period. Of these the system transmits in four (4) timeslots of 595 µsec, leaving the rest of the period empty. The four timeslots are arranged asymmetrically with one before the zero crossing and three after, as illustrated in FIGS. 1a and 1b. The timeslots are numbered as channels 1 to 4. The exemplary signals shown in FIG. 1 correspond to the simplest case where no redundancy is used. The channels 104 and 108 are modulated with frequency 1 and coded as 0, while the channels 106 and 110 are modulated at frequency 2 and coded as 1. The data representing bit pattern is 0101 and is transmitted during this one burst.

The system of the embodiment uses continuous phase FSK with the transmitted signals:

$$s_m(t) = \sqrt{\frac{2\varepsilon}{T}} \cos(2\pi f_c t + 2\pi m \Delta f t) \quad m = 1, 2$$

and $\Delta f$ chosen such that:

$$\Delta f = \frac{k}{T}$$

which provides seamless switching at the end of the burst T. Choosing T=600 μsec and:

$$f_1 = f_c = \frac{70}{T} = 116.7 \text{ kHz}$$

$$\Delta f = \frac{10}{T} = 16.7 \text{ kHz}$$

$$f_2 = f_1 + \Delta f = 133.3 \text{ kHz}$$

completes the definition of the bursts. The receiver uses a bank of correlators as shown in FIG. 3. The correlators are synchronized to the zero crossing of the power line waveform and the output is sampled at the nearest peak at the end of the period T, minimizing the effect of any jitter in the zero crossing detection.

Referring to FIG. 2, cross-correlation of these signals sampled at T is provided by:

$$\rho_{mk} = \frac{1}{2\varepsilon} \int_0^T s_m(t) s_k(t) dt$$

$$= \frac{1}{2\varepsilon} \int_0^T \sqrt{\frac{2\varepsilon}{T}} \cos(2\pi f_c t + 2\pi m \Delta f t) \cdot$$

$$\sqrt{\frac{2\varepsilon}{T}} \cos(2\pi f_c t + 2\pi k \Delta f t) dt$$

Referring to FIG. 2, an exemplary matched-filter receiver for FSK waveforms is shown. In the upper branch the input signal 202 (r(t)) is multiplied by the first FSK frequency reference $s_1(t)$ in the multiplier 204 and the result is integrated in the integrator 208 over a full period T. The resulting signal is sampled by 212, scaled by adder 216 and fed to the decision circuit 220.

In the lower branch the input signal 202 (r(t)) is multiplied by the second FSK frequency reference $s_2(t)$ in the multiplier 206 and the result is integrated in the integrator 210 over a full period T. The resulting signal is sampled by 214, scaled by adder 218 and fed to the decision circuit 220.

The decision circuit 220 chooses the larger of the two signals fed to it, making the decision that if the result of adder 216 is greater than the result of adder 218 then signal $s_1(t)$ was sent, otherwise making the decision that signal $s_2(t)$ was sent.

This equation has two parts, one part at DC and the other part at twice the carrier frequency $f_c$. The result of the integration of the two parts is:

$$\rho_{mk} = \frac{1}{T} \int_0^T \cos(2\pi(m-k)\Delta f t) dt +$$

$$\frac{1}{T} \int_0^T \cos(4\pi f_c t + 2\pi(m+k)\Delta f t) dt$$

$$= \frac{\sin(2\pi(m-k)\Delta f T)}{2\pi(m-k)\Delta f T} + \frac{\sin(4\pi f_c T + 2\pi(m+k)\Delta f T)}{4\pi f_c T + 2\pi(m+k)\Delta f T}$$

$$= 1 \text{ if } m = k$$

$$= 0 \text{ otherwise}$$

where $f_c \cdot T = 70$ and $\Delta f \cdot T = 10$. Note that this correlation is normalized to 1 by dividing the value by the signal power. This correlation also indicates the effect of jitter in the zero crossing mentioned above. In this case the correlation is over a shorter period, resulting in less energy at the output. If the correlator is synchronized by taking the largest output sample near the end of the original burst, the effect can be approximated as the ratio the reduced burst length due to jitter $T_{red}$ to the original burst length T as shown below:

$$\rho_{mk} = \frac{1}{2\varepsilon} \int_0^{T_{red}} s_m(t) s_k(t) dt$$

$$= \frac{1}{2\varepsilon} \int_0^{T_{red}} \sqrt{\frac{2\varepsilon}{T}} \cos(2\pi f_c t + 2\pi m \Delta f t) \cdot$$

$$\sqrt{\frac{2\varepsilon}{T}} \cos(2\pi f_c t + 2\pi k \Delta f t) dt$$

$$= \frac{T_{red}}{T} \left\{ \frac{\sin(2\pi(m-k)\Delta f T_{red})}{2\pi(m-k)\Delta f T_{red}} + \right.$$

$$\left. \frac{\sin(4\pi f_c T + 2\pi(m+k)\Delta f T_{red})}{4\pi f_c T + 2\pi(m+k)\Delta f T_{red}} \right\}$$

$$= \frac{T_{red}}{T} \text{ if } m = k$$

$$= 0 \text{ otherwise}$$

where it is assumed that $T_{red} \cdot f_c$ and $T_{red} \cdot \Delta f$ are still integers. This indicates that a correlation is made over an integral number of cycles of $f_1$ and $f_2$).

For the case where both phases of a cosine waves are used for modulation, the correlation results in $$\rho_{mk} = \frac{1}{2\varepsilon} \int_0^T s_m(t) s_k(t) dt$$

$$= \frac{1}{2\varepsilon} \int_0^T \sqrt{\frac{2\varepsilon}{T}} \cos(2\pi f_c t + 2\pi m \Delta f t + \pi) \cdot$$

$$\sqrt{\frac{2\varepsilon}{T}} \cos(2\pi f_c t + 2\pi k \Delta f t) dt$$

which gives $$\rho_{mk} = \frac{1}{T} \int_0^T \cos(2\pi(m-k)\Delta f t + \pi) dt +$$

-continued $$\frac{1}{T}\int_0^T \cos(4\pi f_c t + 2\pi(m+k)\Delta f t + \pi)dt$$

$$= \frac{\sin(2\pi(m-k)\Delta fT + \pi)}{2\pi(m-k)\Delta fT + \pi} + \frac{\sin(4\pi f_c T + 2\pi(m+k)\Delta fT + \pi)}{4\pi f_c T + 2\pi(m+k)\Delta fT + \pi}$$

$$= 0 \text{ since } (m-k)\Delta fT = \text{integer}$$

$$f_c T = \text{integer}$$

Transmission Methods Using Time and Frequency Diversity

The four time slots may be viewed as four independent channels. Thus signal diversity techniques can be used to improve robustness in the presence of noise. In particular, both time and frequency diversities can be used by transmitting multiple copies on different channels and using one or two frequencies as well as one of two possible phases, as further explained below. Thereafter, various combining techniques can be used to improve the robustness of the detection.

In addition to exploiting the time, frequency and phase diversity, the embodiment also uses a differential receive technique to improve robustness. In this method, rather than relying on the energy at a given frequency, phase and time, a combination of two energy bursts in a specific order are preferably used to signal a bit (e.g. a "1")—the opposite combination being used to signal the opposite bit (e.g. a "0"). In this way, dependence on the amount of energy on the channel at a given phase, time and frequency is replaced by the detection of specific transitions between two energy bursts, further enhancing robustness on very noisy channels. Several examples of this are given below, although this redundancy can be implemented through other techniques by those skilled in the art.

For the embodiment, the following transmission parameters A-E may be used:

A. 480 bps/2 frequencies/1 bit per channel/4 bits per burst.

B. 240 bps/2 frequencies/2 bits per burst/Channel 0 and 1 merged/Channel 2 and 3 merged C. 120 bps/2 frequencies/1 bit per burst/Channel 0 and 1 merged/Channel 2 and 3 merged/A '0' is considered to be a transition from F1 to F2; and a '1' is considered to be a transition from F2 to F1

D. 120 bps/2 frequencies/1 bit per burst/All channel merged

E. 60 bps/2 frequencies/½-bit per burst/All channel merged/A '0' is a considered to be a transition from F1 to F2; and a '1' is a transition from F2 to F1

Other methods made by used using more channels and more frequencies.

Implementation of these parameters are illustrated in Tables 1 to 5 and described below:

TABLE 1

Method A

| Burst 1 | | | |
|---|---|---|---|
| b0 | b1 | b3 | b4 |

TABLE 2

Method B

| Burst 1 | | | |
|---|---|---|---|
| b0 | b0 | b1 | b1 |

TABLE 3

Method C

| Burst 1 | | | | |
|---|---|---|---|---|
| F1 | F1 | F2 | F2 | 0 |
| F2 | F2 | F1 | F1 | 1 |

TABLE 4

Method D

| Burst 1 | | | |
|---|---|---|---|
| b0 | b0 | b0 | b0 |

TABLE 5

Method E

| Burst 1 | | | | Burst 2 | | | | |
|---|---|---|---|---|---|---|---|---|
| F1 | F1 | F1 | F1 | F2 | F2 | F2 | F2 | 0 |
| F2 | F2 | F2 | F2 | F1 | F1 | F1 | F1 | 1 |

Detection Algorithms Using Time, Frequency and Phase Diversity

For the embodiment, the detector uses time and frequency diversity methods to improve the robustness of the transmission. The four channels and the two frequencies are used to make a combined decision depending on the transmitted sequence. The receiver monitors the channel and makes a decision on which transmission method is likely to yield the best result. A reverse channel protocol is used to communicate this decision to the transmitter.

Outlined below with reference to Tables 1-5 are some of the detection methods that can be used, although other methods may also be used as known to those skilled in the art. A basic feature is to use time diversity first by either repeating the same information in a number of time slots or by reducing the number of time slots used by ignoring the ones that are too noisy. The detected signal is then combined with frequency diversity by using only one of the two frequencies to make the decision, ignoring the other one judged to be too noisy. In a general case, k of n time slots are used and 1 of m frequencies are used.

Method A:
1. Use maximum likelihood decision from correlator

Method B
1. Use maximum likelihood decision from correlator on merged channels
2. Use maximum likelihood decision from correlator only on merged channels 1, 2

Method C
1. Use maximum likelihood decision from correlator on merged channels 1, 2 and 3, 4 then apply differential decoding 2. Use maximum likelihood decision from correlator only on merged channels 1, 2 then apply differential decoding
3. Same as 1 or 2 but monitor only change in F1
4. Same as 1 or 2 but monitor only change in F2

Method D
1. Use maximum likelihood decision from correlator on merged channels 1, 2, 3, 4
2. Use maximum likelihood decision from correlator only on merged channels 1, 2
3. Use maximum likelihood decision from correlator only on channel 1
4. Use maximum likelihood decision from correlator only on channel 2

Method E
1. Use maximum likelihood decision from correlator on merged channels 1, 2, 3, 4 in burst 1 and burst 2 and apply differential decoding
2. Use maximum likelihood decision from correlator only on merged channels 1, 2 in burst 1 and burst 2 and apply differential decoding
3. Use maximum likelihood decision from correlator only on channel 1 in burst 1 and burst 2 and apply differential decoding
4. Use maximum likelihood decision from correlator only on channel 2 in burst 1 and burst 2 and apply differential decoding
5. Same as 1 to 4 but monitor only change in F1
6. Same as 1 to 4 but monitor only change in F2

Synchronization, Startup and Tracking

For the embodiment, the embodiment preferably uses a link layer protocol for startup and tracking. Synchronization is achieved by detecting the zero crossing of the power line signal and then looking for the maximum of the larger correlator output to determine the end of the burst near T microseconds after the zero crossing (note that the correlator will contain part of the second burst if the zero crossing is detected late or noise only if it is detected early due to jitter. However, the effect of this is small as shown above). The zero detection circuit can use any signal monitoring or detection circuit known to those skilled in the art. Other embodiments may use other synchronization points for determining where to insert and expect data in the power signal. The zero detection circuit can be designed to trigger a synchronization signal when the value of the power signal is about zero, that it, approaching or near zero volts.

The link layer protocol transmits messages bounded by a start of message sync pattern at the beginning and a CRC byte at the end of the message. The receiver uses this CRC to determine if correct operation has been achieved and sends a positive acknowledgement to the transmitter to that effect.

It is noted that other link layer protocols may also be used in conjunction with the transmission system in other embodiments, as will be evident to those skilled in the art.

Startup is achieved by transmitting at the lowest bit rate, (½ bit per burst in this case). Once successful transmission at this bit rate is achieved (correct CRC received), the receiver monitors all channels and all frequencies to determine if a higher bit rate could be sustained. It then communicates to the transmitter via a control message to use one of the other transmission patterns and switches its detection algorithm accordingly. It should be noted that another implementation can start with the highest bit rate and reduce it in case of bad CRC. Improved robustness can be provided by positively acknowledging each message. This allows the transmitter to revert to the lowest bit rate in case the channel deteriorates to the point where the receiver is not receiving correct data and does not send an acknowledgement. For the embodiment, this provides synchronisation with a frequency or frequencies so that the receiver can receive information from the transmitter.

Analog Front End

Referring to FIG. 3, the analog front end (AFE) is an analog circuit composed of a transmission circuit and a reception circuit. This circuit provides the connection from the digital signal processing portions of the system to the analog portion of the power line. The receiver circuit is always on, whereas the transmitter circuit must be enabled with a logical high (1) on the TX_Enb pin. Both circuits have a protection diode circuit to limit spikes and signals present on the powerline and pass through the coupling. For the embodiment, the AFE is a discrete circuit separate from the microcontroller, such as microcontroller 1804 described below in FIG. 18. However, one of skill in this art would appreciate that other circuit arrangements may be used in other embodiments.

A simplified block diagram of the AFE is shown at 300. For the embodiment, the following provides a summary of different filters that may be used in the AFE:

TABLE 6

AFE Specifications

| Description | Value | Note |
|---|---|---|
| Filter 1 Characteristics | | |
| Filter type | Butterworth Low-Pass | |
| Order | 4 | |
| Cut off Frequency | 180 KHz | @ −3 dB |
| Filter 2 Characteristics | | |
| Filter type | Butterworth High-Pass | |
| Order | 2 | |
| Cut off Frequency | 190 KHz | @ −3 dB |
| Filter 3 Characteristics | | |
| Filter type | (Type) Band-Pass | |
| Order for the high pass | 10 | |
| Order for the low pass | 4 | |
| Cut off Frequency (Low) | 106 KHz | @ −6 dB |
| Cut off Frequency (High) | 160 KHz | @ −6 dB |
| Frequency Center | 125 KHz | |
| Gain | 20 dB | |
| AGC Characteristics | | |
| Gain | >30 dB | |
| Response delay | 30 μS | |
| Power Amplifier Characteristics | | |
| Input impedance | 600 Ω | |
| Output impedance | <1 Ω | |
| Gain | 11 ± 1 dB | |
| Bandwidth | 80-150 kHz | |
| Power | 2.25 Wpeak | (3 Vpeak in 4 Ω) |
| Protection | Short circuit and over voltage | Protected by coupler impedance |
| Distortion | −60 dB (3$^{rd}$ harmonic) | Output impedance: 50 Ω |

Details regarding different aspects of the AFE are now briefly described below. More details regarding AFE's is provided in U.S. Pat. No. 6,727,804, the contents of which are hereby incorporated by reference. Referring now to FIG. 3, there is provide an exemplary AFE 300. AFE 300 includes amplifiers 306 and 312, low pass filters 304 and 310, band pass filters 314 and 318, and high pass filter 316. Connection 320 couples AFE 300 to a coupling circuit, connection 302 and 308 provides to a power line for transmitter and receiver circuits, as described below.

Transmitter Circuit

Referring to FIG. 4, the exemplary amplifier section 400 of the AFE is made up of two stages:

The transmission filter (TX filter); and

A voltage/current stage amplifies the input signal with low-distortion to meet FCC, ICES and CENELEC requirements. Preferably, the output stage has low output impedance. The amplifier is controlled by the Tx_Enb signal. When Tx_Enb is low, the current stage is high impedance to allow power line signal to be received by the RX section. When Tx_Enb is high, the current stage amplifies the signal from the voltage amplifier and transmits it to the coupler.

The amplification is 11±11 dB. As such, the range is 1.7 volts peak-to-peak. The output impedance is less than 1Ω when transmitting and more than 250Ω in idle state. The transmitter preferably uses an integrated circuit provide the amplification. The amplifier preferably supports low impedance on the power line without distorting the signal transmission.

For the embodiment, the two amplifiers 306 and 312 work with a bridge configuration to transmit a 6 Vpp signal on the line from a single 5V supply. The output of the transmission amplifier 306 is not protected against shorts between ground and output. The output signal is transmitted at 6 Vpp for a load greater than 6Ω. For a load smaller than 6Ω, the output signal decreases, but the distortion stays at a low level to avoid transmitting harmonics on the power line.

The band-pass filter of the amplifier preferably has a pass range from 80 kHz to 150 kHz. As the circuit provides a pulse width modulation signal, it is preferably to filter it using a passive low pass filter to reshape the signal to amplify. The transmitting filter is used to filter the signal taken from the circuit and to feed it to the voltage/current amplifier 306. This is accomplished by eliminating the high frequencies of the TX signal at the input of the amplifier. This may be done by a low pass filter 500 as shown in FIG. 5. An exemplary circuit 600 for a high pass filter is shown in FIG. 6.

Receiver Circuit

For the embodiment, the receiving circuit is preferably always enabled. It receives the signal from the power line and filters it for the circuit. The receiver provides the following functions:

Extract the inbound signal of the noise present at the output of the coupling circuit by a efficiency filtering Compress the signal without clipping it to preserve the shape when the maximum amplitude is reached Amplify the signal when it is necessary; depending of the attenuation present on the powerline Warn the circuit when the signal is being compressed and when the line is noisy To perform these functions, the receiver is divided in several sections which are independent of each other. Depending of performances required for different applications, different sections can be added and taken out of the circuit. For the embodiment, the following sections are available:

A high pass filter

A protection diode circuit

A band-pass filter and amplifier

A high pass filter

A protection diode circuit

A band-pass filter and amplifier

A low pass filter

A band-pass filter and amplifier

A limiter that react as a protection for the circuit

An automatic gain control amplifier which control gain of two of the three amplifiers The sections preferably clean the signal, but do not saturate and preferably preserve the shape of the signal. The minimum signal to be detected by the AFE is 30 µV if the noise floor is lower than −97 dB (Vpp). This gives a sensitivity of −97 dB.

Each of the sections of the receiver circuit are now described in turn. Referring first to FIGS. 6 and 9, high-pass filters 600 and 900 respectively are shown. It will be appreciated that each filter operates in a manner known to those skilled in the art. It will also be appreciated that the pass point for either filter may be set according to operation characteristics required by the system.

Referring to FIGS. 7, 10 and 14, protection circuits 700, 1000 and 1400 are shown. Either protection circuit may clamp voltages to a predetermined level to prevent overloading of the circuits downstream to them. Other protection circuits may be provided. In particular, limiter 1400 that react as a protection for a processing circuit.

Referring to FIGS. 8, 11 and 13, a band-pass filter and amplifier circuits 800, 1100 and 1300 respectively are shown. It will be appreciated that each band-pass filter operates in a manner known to those skilled in the art. It will also be appreciated that the pass points for each filter may be set according to operation characteristics required by the system. Each amplifier operates to amplify the output signal of the band-pass filter. The level of amplification can be designed to meet operation characteristics required by the system.

Referring to FIG. 12, a low pass filter 1200 is shown. It will also be appreciated that the pass point for the filter may be set according to operation characteristics required by the system.

Referring to FIGS. 15a and 15b, an automatic gain control (AGC) amplifier 1500a and 1500b that controls gain of two of the three amplifiers are shown. The AGC is designed to have fast response within 80 µS. This is enough fast to control amplification of the different section of the receiver and gives feedback to the circuit.

Referring now to FIG. 16, an optimized reception and transmission of multiple frequencies using a single sine wave is now described and shown in graph 1600. As shown, there is a 356 point 2.5 kHz sine wave stored in RAM memory (for a sampling rate of 888888.8 samples per seconds). This single sine wave is used by the DSP to perform discrete time Fourier transfer (DTFT) on any frequency that is a multiple of 2.5 kHz.

The following function performs the DTFT at 110 kHz using this table. It is noted that only N register needs to be modified in order to select any frequency:

```
moveu.w #356,LC            // 2c
moveu.w #(32768 + 356−1), M01      // R0 and R1 are configured as MOD(356) Addressing
move.w #44,N               // 44 × 2.5 kHz = 110 kHz parameter
moveu.w #DFTTable + 89,R0  // Imaginary Part (Cos) offset of 90 degrees
moveu.w #DFTTable,R1       // Real Part (Sin) no offset
moveu.w #TestBuffer,R3     // ADC Data Ptr
clr a x:(r1)+N,y1          // real part + add(N) to r1
nop
clr b x:(r0)+N,y0 x:(r3)+,x0    // imaginary part + add(N) to r0
DOSLC _ENDOFLOOP
        mac y1,x0,a x:(r1)+N,y1         // real part +
```

```
add(N) to r1
    mac y0,x0,b x:(r0)+N,y0 x:(r3)+,x0    // imaginary part
+ add(N) to r0
    _ENDOFLOOP:
```

Referring to FIG. 17, graph 1700 shows relationships between the various input signals and channels. In particular, it provides a three dimensional portrayal of the information shown in FIG. 1. Therein, an exemplary system utilizes twelve channels in twelve sequential time slots [0], [1], [2] . . . [11]. In other embodiments, more or less slots can be used. Data is encoded in the channels around the zero crossing of the AC signal. These are shown in burst signals shown grouped as blocks of signals 1702, 1704 and 1706. Each burst signal includes data encoded in each of the 12 channels. The peak signal in each channel in each zero crossing is the encoded data element. Other energies in the signal in the channel include noise and harmonics associated with the injected signals. The regions 1708 show less energies therein because they represent the power signal around non zero crossing regions and as such, no data encoded in the power signal at those regions.

Transmitter and Receiver Circuit

Referring now to FIGS. 18-26 aspects of another embodiment are shown. In particular, a complementary transmit and receive module is described implementing aspects of the earlier described synchronization, transmission and reception techniques.

Figure 20:
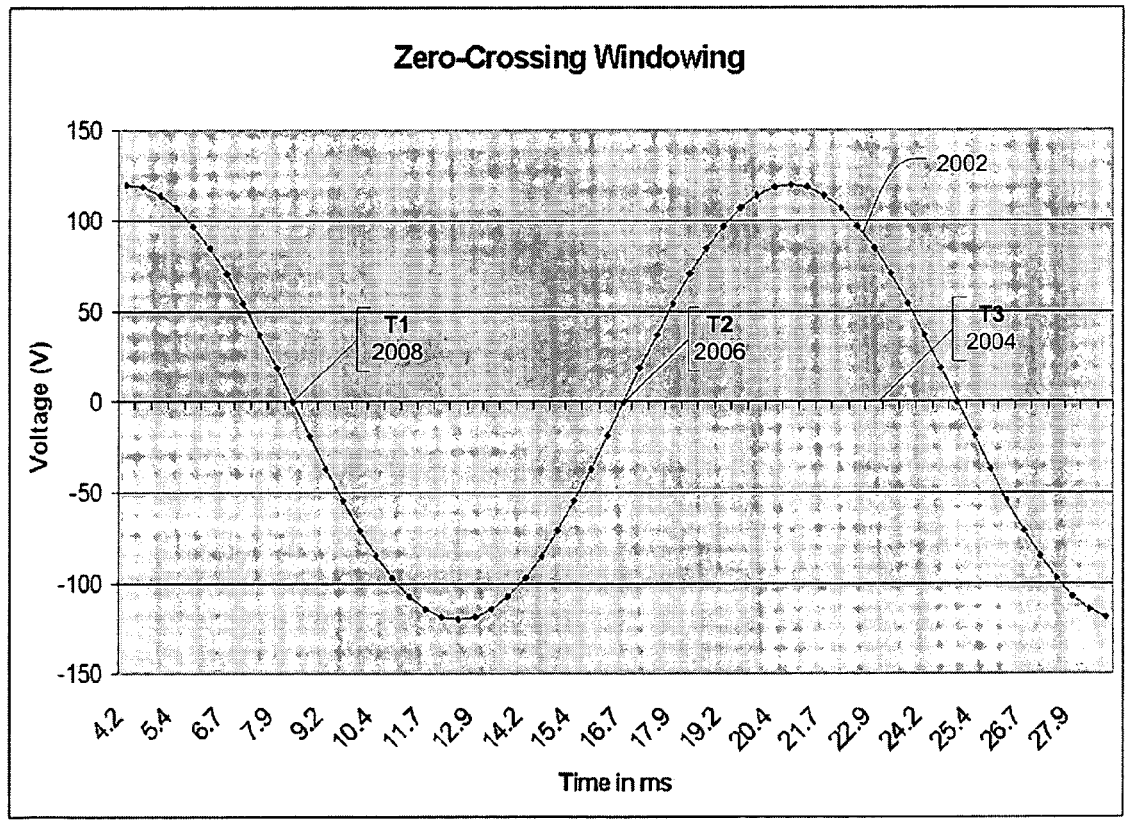
FIG. 20 is a voltage-time graph of a set of signals processed by the AFE of FIG. 18.

FIG. 18 shows system 1800, where AFE 1802 receives analog signals from and inserts data in the signals on powerline 1806. Powerline 1806 is the medium over which data may be exchanged through its power signals. Microcontroller 1804 provides the modules for encoding and decoding data from the power signals using systems and methods described herein. Software operating on microcontroller 1804 is stored in a non-volatile memory location (not shown) and controls operation of the microcontroller in how it processes information and data received and sent to the AFE 1802. Referring to FIG. 20, at initialization, transmitters and receivers synchronize themselves by the means of the powerline 2002 having zero-crossings 2006, 2008. The zero-crossing 2006, 2008 point of the powerline 2002 is used to estimate where a "burst" to be transmitted by the transmitter or as to be captured by the receiver is located.

Referring again to FIG. 18, on reception a data signal is received from powerline 1806 by the AFE 1802 by way of coupling circuit 1808. Bandpass filter and gain 1810 is used to filter the signal and to increase its strength. After this stage, the signal is routed through to the micro-controller ADC or comparator 1818 on microcontroller 1804. The samples received are then stored to RAM 1824 as needed. Microcontroller 1804 can then decode data from the signal. In decoding the data, microcontroller can determine what channel (if any) the data came from and can then use the data to reconstruct an original data string, if additional data is required from additional channels or bursts.

On transmission, the microcontroller 1804 determines what data is to be encoded, what channel (if any) that the data is to be sent on and then encodes the data into a PWM signal via its pulse width modulator or DAC 1820. This analog signal is then sent to AFE 1802 and filtered in order to meet any applicable regulations by filter 1814. Once filtered, the signal is amplified by amplifier 1812 and is transmitted to powerline 1806 via coupling circuit 1808 for transmission. Timing of the insertion of the signal can be controlled, in part, by the zero-detection circuit.

Figure 19:
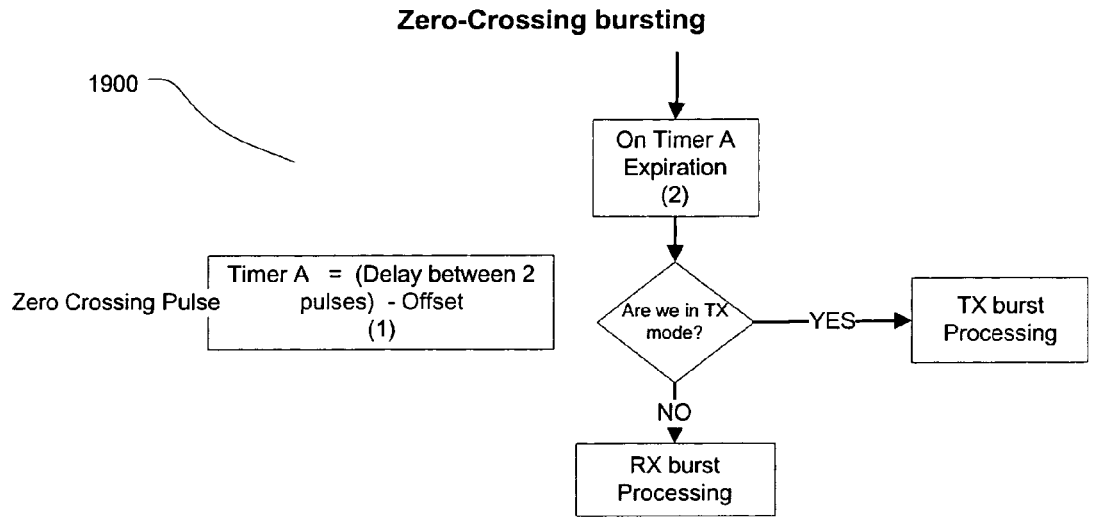
FIG. 19 is a flow chart of a zero-crossing algorithm used by the AFE of FIG. 18.

Referring to FIGS. 19 and 20, the zero crossing circuit implements algorithm 1900 is shown. Referring first to FIG. 19, there is an example of a zero-crossing synchronization shown on flowchart 1900, in which 2 timers are used and where a "burst" begins before the zero-crossing point. In relation to FIG. 20, the timer described in FIG. 19 is for calculating a delay between a previous zero-crossing (such as 2008 in FIG. 20) and the current zero-crossing pulse (such as 2006 in FIG. 20). A second timer is then loaded with this calculated value minus the "burst" offset. This second timer may then expire at the start of the "burst" (such as identified as 2004 in FIG. 20) and depending on the device state, it can issue a transmission or a reception. This process can be repeated indefinitely.

Figure 21:
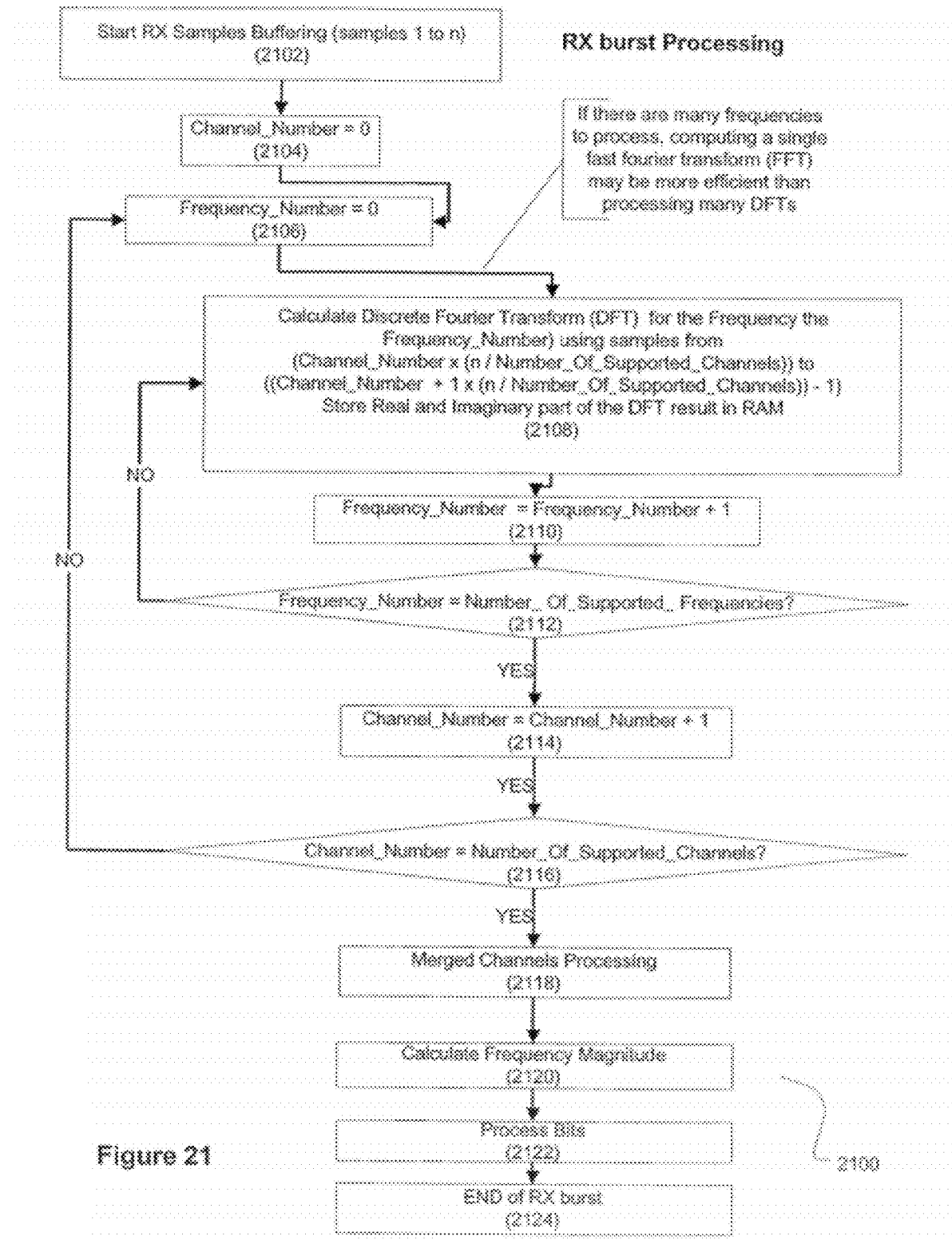
FIG. 21 is a flow chart of a receive window signal algorithm implemented by the AFE of FIG. 18.

Referring to FIG. 21, the RX WindowProcessing step of chart 1900 is shown in greater detail. As RX WindowProcessing begins, the receiver and transmitter are already synchronized, and synchronization is no longer an issue. The goal of the RX WindowProcessing is to show how various channels and frequencies can be processed during the "burst". This processing is performed by the microcontroller 1804 of FIG. 18. The signal received is the output of the ADC or comparator 1818. At the beginning of a burst, the RX samples are buffered for the entire duration of the burst at step 2102. As such, n samples are buffered into RAM memory 1824. The burst is separated into many channels, where the samples are equally distributed. Once the buffering is complete, discrete Fourier transforms (DFTs) are calculated for each channel and each frequency at steps 2108-2116. For example, if there are 4 channels in each burst and if 8 frequencies are analyzed by the receiver then 32 DFTs are performed.

Once each channel's frequency DFTs results are stored into memory, the merged channel processing step 2118 is performed, as described in greater detail below. Thereafter, the calculate frequency magnitude step 2120 is performed, and after all magnitudes are processed at step 2120, the bit processing step is performed at step 2122. For the embodiment, once each channel's frequency DFTs results are stored into memory, the merged channel processing step 2118 is performed, as described in greater detail below. Thereafter, the calculate frequency magnitude step 2120 is performed. This step is used in order to determine the relative power of each frequency based on the complex numbers outputted from previous steps. After all magnitudes are processed at step 2120, the bit processing step is performed at step 2122. This step is used to determine if the device is receiving 0s or 1s by comparing the various frequency magnitudes.

Figure 22:
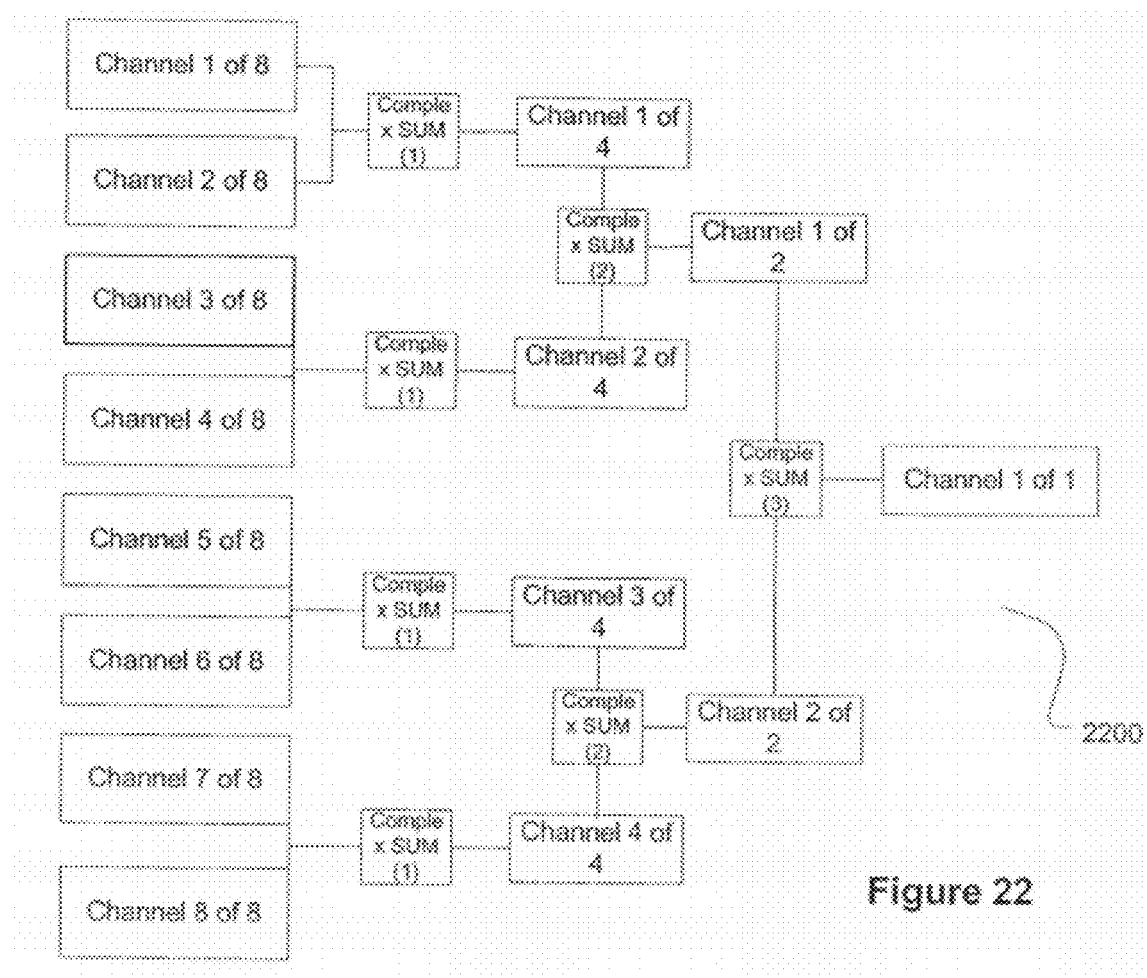
FIG. 22 is a block diagram of a merged channels algorithm implemented by the AFE of FIG. 18.

Referring to FIG. 22, a block diagram of elements used to provide merged channel processing from step 2118 described above is shown at 2200. At this stage, all the signal filtering and processing has been completed, and the merged channels processing is no longer concerned with signal samples but rather with complex numbers that are the output of the DFT or FFT as described above. In the embodiment, channel merging is performed in order to support lower-baud rate and increase robustness against noise. For example, FIG. 22 shows the sum of many channels can be analysed to create a slower process that tends to be more robust against noise.

Since the output of the DFT is a complex number, merged channel processing may add two channels by performing a complex addition of the complex number DFT output of the two channels. As there may be many frequencies per channel, a separate sum is performed for each frequency. The complex sum is therefore the addition of the imaginary part of both channels to be merged and the addition of both real parts of the channels to be merged:

Channel 1 of 4 REAL=(Channel 1 of 8 REAL+Channel 2 of 8 REAL)

Channel 1 of 4 IMG=(Channel 1 of 8 IMG+Channel 2 of 8 IMG)

For example, referring to FIG. 22, 7 merged channels are created by merging the 8 base channels, as shown in flow chart 2200. Seven sum operations per supported frequency are required to create these extended channels. It will be appreciated that it is also possible to create other channels, for example one can create a merged channel by the sum of (Channel 2 of 4) and (Channel 3 of 4).

Referring to FIG. 23, a formula for calculating the magnitude of the frequency per step 2120 above is shown at 2300. As described above, the output of the FFTs and DFTs process from FIG. 21, and the output of the channel merge processing in FIG. 22, are expressed as a complex number for each channel by each frequency. For example, for a 2-frequency modulation, if there are 2 channels per burst and 1 merged channel that is the sum of the 2 channels, the output of the processing from merged channel processing will be the following 6 complex numbers Complex Number 1 (Channel 1 Frequency 1)

Complex Number 2 (Channel 1 Frequency 2)

Complex Number 3 (Channel 2 Frequency 1)

Complex Number 4 (Channel 2 Frequency 2)

Complex Number 5 (Sum of Complex Number 1 and Complex Number 3)

Complex Number 6 (Sum of Complex Number 2 and Complex Number 4)

A complex number can be expressed as a 2-dimension vector with a real and an imaginary part. The angle of this vector is the phase of the entry signal for the given frequency. The length of this vector is the power (or magnitude) of the frequency. The equation shown in FIG. 23 is thus used to calculate the power of the frequency based on the complex number associated with that frequency. The magnitude of each frequency is also calculated in order find the frequency with the higher power.

A set of tables indicating how frequencies are mapped to bit codings are shown in the following paragraph, per step 2122 described above. The input of the process bit processing step is a magnitude for every channel and frequency. With this magnitude of each frequency one can determine which frequency was most likely transmitted by the transmitter device (i.e., the frequency with the highest magnitude) in relation to FSK demodulation, as described above.

The tables shown below set out an exemplary bit coding for each frequency, depending on the number of frequencies supported by the devices. For example, the first table shows a high speed technique using 16 frequencies on 24 channels (11520 bps on a 60 Hz powerline). Four bits are calculated for each channel, the bit values being the binary values of the frequency number having the biggest magnitude (i.e. from 0000 to 1111). The second table shows a medium speed technique using 8 frequencies and 6 merged channels over the 24 base channels (2160 bps on a 60 Hz powerline). Three bits are calculated for each channel, the bit values again being the binary values of the frequency number having the biggest magnitude (i.e. from 000 to 111).

| Frequency # | Frequency in kHz (example) | Bit Coding |
| --- | --- | --- |
| 0 | 100 | 0000b |
| 1 | 105 | 0001b |
| 2 | 110 | 0010b |
| 3 | 115 | 0011b |
| 4 | 120 | 0100b |
| 5 | 125 | 0101b |
| 6 | 130 | 0110b |
| 7 | 135 | 0111b |
| 8 | 140 | 1000b |
| 9 | 145 | 1001b |
| 10 | 150 | 1010b |
| 11 | 155 | 1011b |
| 12 | 160 | 1100b |
| 13 | 165 | 1101b |
| 14 | 170 | 1110b |
| 15 | 175 | 1111b |

| Frequency # | Frequency in kHz (example) | Bit Coding |
| --- | --- | --- |
| 0 | 100 | 000b |
| 1 | 110 | 001b |
| 2 | 120 | 010b |
| 3 | 130 | 011b |
| 4 | 140 | 100b |
| 5 | 150 | 101b |
| 6 | 160 | 110b |
| 7 | 170 | 111b |

Additionally, another example of bit coding for a differential bit receiver is shown below, In this example, the bits are calculated as the variation of the magnitude over 2 bursts. If the magnitude for frequency 0 decreases, the bit is 0, otherwise the bit is 1. Similarly, for frequency 1, if the magnitude for frequency 1 decreases, the bit is 1, otherwise the bit is 0. The chart in FIG. 24 summarizes this example of bit coding for a different bit receiver.

| Burst 0 | | Burst 1 | | |
| --- | --- | --- | --- | --- |
| Frequency # | Frequency in kHz (example) | Frequency # | Frequency in kHz (example) | Bit Coding |
| 0 | 100 | 1 | 110 | 0b |
| 1 | 110 | 0 | 100 | 1b |

Figure 25:
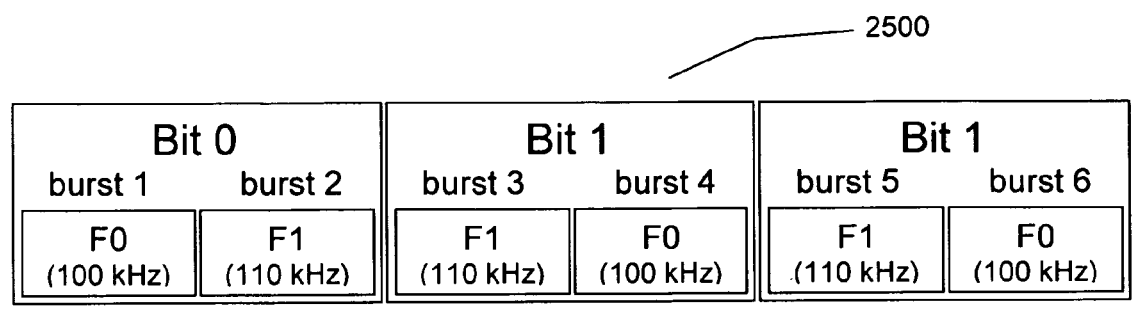
FIG. 25 shows 6 bursts required to transmit '011' using differential bit encoding.
Figure 26:
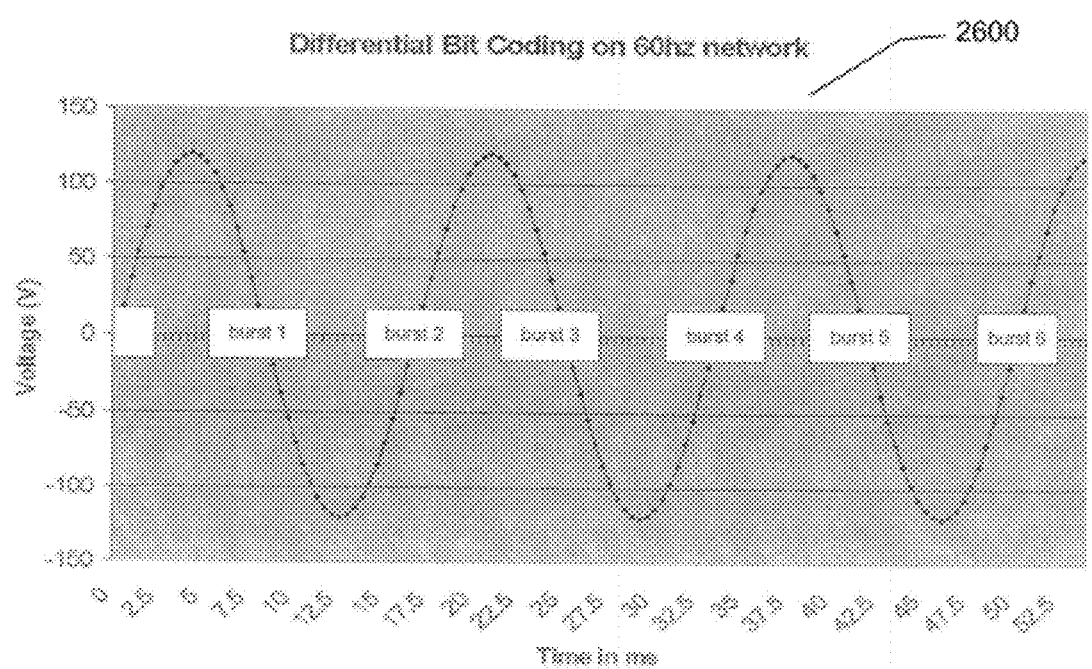
FIG. 26 is a voltage-time graph of a set of signals generated by a differential bit encoding algorithm used by the AFE of FIG. 18.

Referring to FIGS. 25 and 26, an example of differential bit coding processing for a signal is provided. FIGS. 25 and 26 show an example of a differential bit coding transmission. FIG. 25 shows 6 bursts required to transmit '011' on the medium, as shown at 2500, using communication method E (60 bps differential using all channels merged and 2 two frequencies). To decode these bits, the demodulator compares the variations of the magnitudes for the given frequencies over the bursts. For example, if the F0 magnitude decreases, a 0 is detected, otherwise a 1 is detected. The same can be done for F1 in parallel. FIG. 26 shows a graph 2600. For each bit, 2 bursts are required. A '0' requires a 100 kHz burst followed by a 110 kHz burst while a '1' requires a 110 kHz burst followed by a 100 kHz burst. The bursts 1 to 6 are mapped to time into the FIG. 26. The bursts are synchronized with the powerline (see for example, FIG. 18 section 1806) and zero-crossings (see for example, FIG. 18, section 1816 and 1822).

It will be appreciated that the same principles may be used in transmission in order to generate a pulse width modulated wave.

The embodiments above have described systems and methods for encoding data into AC signals in timeslots about a zero crossing of the AC signal. It will be appreciated that in other embodiments, other predetermined points(s) of the AC signal may be used. For example, a peak/trough detect circuit can be used and the data may be inserted at or near a peak/trough value of the signal. Alternatively the data can be inserted at a predetermined offset from the peak/trough value.

Further still, in other embodiments, data may be inserted in non-AC signals. Such DC-based signals may be provided, for example, on twisted pair transmission lines.

Although the invention has been described with reference to certain specific embodiments, various modifications thereof will be apparent to those skilled in the art without department from the scope of the invention.

We claim:

1. A method, comprising:
   transmitting data in an AC power line signal in a first transmission period, the transmitted data being modulated initially into a first set of time slots dividing the first transmission period; and
   responsive to an indication that transmitted data of the first transmission period was not received properly at a receiver, transmitting data in the AC power line signal in a second transmission period according to a modulation scheme in a second set of time slots dividing the second transmission period, the modulation scheme including encoding at least one bit of the data into a greater number of time slots than would occur according to the initial modulation.

2. The method of claim 1, wherein the first and second sets of time slots include similar time slots in different transmission periods.

3. The method of claim 1, wherein the first and second sets of time slots include every available time slot within each transmission period.

4. The method of claim 1, wherein the first and second sets of time slots include different time slots in different transmission periods.

5. The method of claim 1, wherein a binary frequency shift keying modulation is used in the initial modulation and the modulation scheme.

6. The method of claim 1, wherein the first and the second sets of time slots are centered around different zero-crossings of the AC power line signal.

7. The method of claim 1, wherein one bit of the data is initially modulated in each time slot of the first set of time slots.

8. The method of claim 7, wherein the modulation scheme includes redundantly encoding the at least one bit of the data over a plurality of the second subset of time slots.

9. The method of claim 8, wherein the modulation scheme includes redundantly encoding the at least one bit of the data over a plurality of the second set of time slots centered around a same zero-crossing of the AC power line signal.

10. The method of claim 8, wherein the modulation scheme includes redundantly encoding the at least one bit of the data over a plurality of the second set of time slots centered around different zero-crossings of the AC power line signal.

11. The method of claim 1, wherein the modulation scheme includes redundantly encoding the at least one bit of data using frequency diversity.

12. The method of claim 11, wherein the redundantly encoded data is encoded in at least one time slot in a plurality of second transmission periods at a different frequency in each of the second transmission periods, each of the second transmission periods having time slots centered around respective zero-crossings of the AC power line signal.

13. The method of claim 1, wherein the indication is a failure to receive a delivery confirmation from the receiver within a predetermined time.

14. The method of claim 1, wherein the delivery confirmation is received through a positive acknowledgement protocol.

15. The method of claim 1, further comprising iteratively transmitting the data into additional sets of time slots with increasing redundancy after the indication occurs at each iteration.

16. A circuit comprising:
   a connection to an AC power line signal;
   an encoding module to initially modulate data into a first set of time slots dividing a first transmission period of the AC power line signal; and
   a processing device to determine whether the initially modulated data was properly received at a receiver, the encoding module modulating data determined to be improperly received into a second set of time slots in a second transmission period, the modulating of improperly received data including encoding at least one bit of the improperly received data into a greater number of time slots than would occur according to the initial modulation.

17. The circuit of claim 16, wherein the processing device is a microcontroller and the encoding module is part of the microcontroller.

18. A method, comprising:
   initially transmitting first data over a plurality of time slots dividing a time period in a power line signal, and
   subsequently transmitting second data over a subset of the time slots in a different time period likely to yield least noise based on transmission information received from a receiver pertaining to the initial transmission.

19. The method of claim 18, wherein the first data is different from the second data.

20. The method of claim 18, wherein the first data is the same as the second data.

21. The method of claim 18, wherein the transmission information provides a basis for comparing noise levels over the plurality of time slots.

22. The method of claim 21, wherein the transmission information identifies the subset of time slots likely to yield least noise.

23. The method of claim 18, wherein each time period includes a zero-crossing of the power line signal.

24. The method of claim 18, wherein at least one time period includes a plurality of zero-crossings of the power line signal.

25. The method of claim 18, further comprising initially transmitting the first data over a plurality of frequencies in the plurality of time slots and subsequently transmitting the second data over a subset of the plurality of frequencies likely to yield least noise based on the transmission information received.

26. The method of claim 25, further comprising initially transmitting the first data over a plurality of phases in the plurality of time slots and subsequently transmitting the second data over a subset of the plurality of phases likely to yield least noise based on the transmission information received.

* * * * *

UNITED STATES PATENT AND TRADEMARK OFFICE
CERTIFICATE OF CORRECTION

| | |
|---|---|
| PATENT NO. | : 8,223,880 B2 |
| APPLICATION NO. | : 11/376949 |
| DATED | : July 17, 2012 |
| INVENTOR(S) | : Steve Baril et al. |

Page 1 of 1

It is certified that error appears in the above-identified patent and that said Letters Patent is hereby corrected as shown below:

In column 17, line 57, change "second set of time" to --second subset of time--.

Signed and Sealed this
Twenty-ninth Day of January, 2013

David J. Kappos
*Director of the United States Patent and Trademark Office*